(12) United States Patent
Aoki

(10) Patent No.: US 7,664,316 B2
(45) Date of Patent: Feb. 16, 2010

(54) IMAGE PROCESSING APPARATUS, IMAGING APPARATUS, IMAGE PROCESSING METHOD, IMAGE PROCESSING PROGRAM AND RECORDING MEDIUM

(75) Inventor: Atsushi Aoki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 889 days.

(21) Appl. No.: 11/211,882

(22) Filed: Aug. 24, 2005

(65) Prior Publication Data

US 2006/0044409 A1 Mar. 2, 2006

(30) Foreign Application Priority Data

Aug. 24, 2004 (JP) ............................ 2004-244357

(51) Int. Cl.
G06K 9/00 (2006.01)
G06K 9/48 (2006.01)
G06K 9/40 (2006.01)
G03F 3/08 (2006.01)
H04N 5/228 (2006.01)

(52) U.S. Cl. .................. 382/162; 382/199; 382/266; 358/518; 348/222.1

(58) Field of Classification Search ............... 382/162, 382/266, 199; 358/518–523; 348/222.1
See application file for complete search history.

(56) References Cited

U.S. PATENT DOCUMENTS

| 6,904,166 | B2 * | 6/2005 | Hsia et al. ............... 382/162 |
| 2003/0142865 | A1 * | 7/2003 | Hirota et al. ............ 382/167 |
| 2003/0184815 | A1 * | 10/2003 | Shiki et al. ............. 358/453 |
| 2005/0219631 | A1 * | 10/2005 | Accad et al. ........... 358/3.26 |
| 2006/0198556 | A1 * | 9/2006 | Chen et al. ............. 382/162 |

FOREIGN PATENT DOCUMENTS

| JP | 2931520 | 5/1999 |
| JP | 2003-111092 | 4/2003 |
| JP | 2003-134523 | 5/2003 |
| JP | 2004-180059 | 6/2004 |

* cited by examiner

*Primary Examiner*—Brian P Werner
*Assistant Examiner*—Randolph Chu
(74) *Attorney, Agent, or Firm*—Edwards Angell Palmer & Dodge LLP; David G. Conlin; William J. Daley, Jr.

(57) ABSTRACT

The data interpolation section 6 includes: a direction data calculation section 61 for calculating a plurality of direction data, each of the plurality of direction date indicating a directional amount along a plurality of directions including at least one of an upper right direction and a lower right direction within the vicinity of a target pixel; a direction detection section 62 for detecting at least one direction of the edge within the vicinity of the target pixel by using the plurality of direction data calculated by the direction data calculation section 61; a direction color signal calculation section 63 for calculating at least one color signal corresponding to the at least one direction detected by the direction detection section 62; and a target pixel color signal calculation section 64 for calculating a color signal for the target pixel by using the at least one color signal calculated by the direction color signal calculating section 63.

39 Claims, 12 Drawing Sheets

(a) Upper right direction  (b) Horizontal direction  (c) Lower right direction  (d) Vertical direction

FIG. 7

| V11 | V21 | V31 | V41 | V51 |
|-----|-----|-----|-----|-----|
| V12 | V22 | V32 | V42 | V52 |
| V13 | V23 | V33 | V43 | V53 |
| V14 | V24 | V34 | V44 | V54 |
| V15 | V25 | V35 | V45 | V55 |

FIG. 11 PRIOR ART

| G | B | G | B | G |
|---|---|---|---|---|
| R | G | R | G | R |
| G | B | G | B | G |
| R | G | R | G | R |
| G | B | G | B | G |

FIG. 12A  PRIOR ART

| G11 | Q21 | G31 | Q41 | G51 |
|-----|-----|-----|-----|-----|
| P12 | G22 | P32 | G42 | P52 |
| G13 | Q23 | G33 | Q43 | G53 |
| P14 | G24 | P34 | G44 | P54 |
| G15 | Q25 | G35 | Q45 | G55 |

FIG. 12B  PRIOR ART

| P11 | G21 | P31 | G41 | P51 |
|-----|-----|-----|-----|-----|
| G12 | Q22 | G32 | Q42 | G52 |
| P13 | G23 | P33 | G43 | P53 |
| G14 | Q24 | G34 | Q44 | G54 |
| P15 | G25 | P35 | G45 | P55 |

FIG. 13A PRIOR ART

| 250 | 250 | 250 | 2 | 2 |
|-----|-----|-----|---|---|
| 250 | 250 | 250 | 2 | 2 |
| 250 | 250 | 2   | 2 | 2 |
| 250 | 250 | 2   | 2 | 2 |
| 250 | 2   | 2   | 2 | 2 |

FIG. 13B PRIOR ART

| G11 | B21 | G31 | B41 | G51 |
|-----|-----|-----|-----|-----|
| R12 | G22 | R32 | G42 | R52 |
| G13 | B23 | G33 | B43 | G53 |
| R14 | G24 | R34 | G44 | R54 |
| G15 | B25 | G35 | B45 | G55 |

IMAGE PROCESSING APPARATUS, IMAGING APPARATUS, IMAGE PROCESSING METHOD, IMAGE PROCESSING PROGRAM AND RECORDING MEDIUM

This Nonprovisional application claims priority under 35 U.S.C. §119(a) on Patent Application No. 2004-244357 filed in Japan on Aug. 24, 2004, the entire contents of which are hereby incorporated by reference.

BACKGROUND OP THE INVENTION

1. Field of the Invention

The present invention relates to an image processing apparatus for generating a color signal for each pixel using data interpolation processing of color signals for a target pixel and at least one pixel within the vicinity thereof the target pixel, based on color signals output from a solid state image pickup device. The solid state image pickup device includes a plurality of pixel sections on which a plurality types of color filters are separately arranged. The present invention further relates to an imaging apparatus including the image processing apparatus, such as a single-chip digital camera, a video camera and a mobile phone with a camera. The present invention further relates to a an image processing method corresponding to the image processing apparatus, an image processing program for having a computer execute the image processing method, and a computer-readable recording medium on which the image processing program is recorded.

2. Description of the Related Art

Conventionally, only information on the brightness of light is output from a solid state image pickup device such as a CCD and a CMOS used in a digital camera or a video camera.

In a single-chip camera having one solid state image pickup device, in order to obtain color information, the front of the CCD is covered with color filters which respectively pass only one color component for each pixel included in the CCD, and each of the pixel sections outputs a corresponding color component when in operation. For example, when primary-color filters are used, there are three types of color components respectively for the three primary colors, namely, R (red), G (green), and B (blue).

A number of suggestions have been made as to how to arrange the color components of the color filters.

A typical example is a Bayer array shown in FIG. 11. In the Bayer array, "G"s which make relatively larger contribution to luminance signals are arranged in a checkerboard pattern, and "R"s and "B"s are arranged in the rest of the area, also in a checkerboard pattern.

At a point in time when a signal is output from a CCD covered with color filters arranged in a Bayer array or the like, only color information for one color out of the RGB color components is obtained for each pixel.

Thus, interpolation processing is performed by an image processing section in order to obtain other color information, by calculating for each pixel information for the other two colors, using color signal values of the pixels in the vicinity of the target pixel on the basis of conjecture.

In addition, interpolation processing is sometimes performed on the color information of one color for each pixel that is obtained by a CCD, using the color signal value of the target pixel itself and the color signal values of the pixels in the vicinity of the target pixel (which may be referred to as "vicinity pixels").

The following describes the bilinear method, which is a conventional interpolation processing method, with reference to FIGS. 12A and 12B.

FIG. 12A shows a Bayer array in a case where the color component of a target pixel is G.

FIG. 12B shows a Bayer array in a case where the color component of a target pixel is either R or B. It should be noted that a pair made up of P and Q represents the color components R and B, or the color components B and R. In other words, when P represents R, Q represents B. On the other hand, when P represents B, Q represents R.

When color filters are arranged in a Bayer array, interpolation formulas <Formulae 1> according to the bilinear method can be expressed as below:

<Formulae 1>

In the case where a target pixel is G33 as shown in FIG. 12A, (the color element of the target pixel being G), <Formulae 1> is as below:

$Go=G33$ or $Go=(G33\times 4+G22+G42+G24+G44)/8$ $Po=(P32+P34)/2$ $Qo=(Q23+Q43)/2$ In the case where a target pixel is P33 as shown in FIG. 12B, (the color element of the target pixel being either R or B), <Formulae 1> is as below:

$Go=(G32+G23+G43+G34)/4$ $Po=P33$ $Qo=(Q22+Q42+Q24+Q44)/4$ where

Go denotes an output G signal of the target pixel,

Po denotes an output P signal of the target pixel,

Qo denotes an output Q signal of the target pixel, and (P, Q)=(R, B) or (B, R).

However, in a case where interpolation processing is performed on color signals for an image changing from white to black, using the conventional bilinear method shown above, it is known that a false color signal (hereafter simply referred to as a moiré signal) may be generated at an edge portion.

As a method for reducing such moiré signals, Japanese Patent No. 2931520 proposes an interpolation processing method by which occurrence of moiré signals is restrained with the use of color correlations.

An image in general has characteristics such as "in a local area with color signals, the ratio of a low-frequency component to a high-frequency component of a specific color component is equal to a ratio in another color component", and also "in a local area with color signals, the difference between a G signal and a R signal or between a G signal and a B signal is approximately equal to each other between adjacent pixels."

The interpolation processing method disclosed in Japanese Patent No. 2931520 utilizes the characteristics mentioned above and detects correlations in the color signals arranged in a Bayer array between the vertical direction (the lengthwise direction) and the horizontal direction (the widthwise direction) so that the interpolation processing is performed with the use of the correlations. Specifically, color signals by an interpolation processing for a cage where there is a correlation in a vertical direction and color signals by an interpolation processing form a ase where there is a correlation in a horizontal direction are calculated in advance, and these color signals calculated by the interpolation processing for different directions are mixed in accordance with the strengths of the vertical correlation and the horizontal correlation.

According to the conventional interpolation processing method disclosed in Japanese Patent No, 2931520 mentioned above, the moiré signals are reduced compared to the case where the bilinear method is used. However, an image in general has a large number of edges in various directions other than the vertical direction (the lengthwise direction) and the horizontal (the widthwise direction) direction. In accordance with the interpolation processing method disclosed in Japanese Patent No. 2931520, color signals obtained from interpolation processing in the two directions are mixed based on two types of correlation data (the strength levels of correlations) for the vertical direction and the horizontal direction, even though the large number of edge directions exist; therefore, in some cases, moiré signals may occur due to an edge in a diagonal direction.

For example, the following describes a case where a solid state image pickup device such an a CCD includes color filters as shown in FIG. 13D so that monochrome color signals shown in FIG. 13A are obtained as a result of an A/D conversion.

FIG. 13A corresponds to a part of an edge portion that is at an angle towards the top right from a vertical direction. In the cave where interpolation processing is performed on the color signal values in FIG. 13A, according to the correlations using color differences for five pixels by three pixels, as disclosed in Japanese Patent No. 2931520, the color signals are expressed as follower $$Rv = G33 + (R32 + R34)/2 - (G31 + 2 \times G33 + G35)/4$$
$$= 64$$
$$Gv = G33$$
$$= 2$$
$$Bv = G33 + B23 - G23$$
$$= G33 + B23 - \{B23 + (G22 + G24)/2 -$$
$$(B21 + 2 \times B23 + B25)/4\}$$
$$= -60$$
$$Rh = G33 + R32 - G32$$
$$= G33 + R32 - \{R32 + (G22 + G42)/2 -$$
$$(R12 + 2 \times R32 + R52)/4\}$$
$$= 64$$
$$Gh = G33$$
$$= 2$$
$$Bh = G33 + (B23 + B43)/2 - (G13 + 2 \times G33 + G53)/4$$
$$= 64$$

It should be noted, however, that the color signals Rv, Gv, and Bv are color signals obtained when a processing that is suitable for a case where the correlation in the vertical direction is strong is performed. On the other hand, the color signals Rh, Gh, and Bh are color signals obtained when a processing that is suitable for a case where the correlation in the horizontal direction is strong is performed.

When the calculation formulae for correlation coefficients with directions disclosed in Japanese Patent No. 2931520 are used, the correlation coefficient for the horizontal direction is zero; therefore, when a color signal is to be calculated, only the color signals in the vertical direction are used as references.

Accordingly.

$$Ro=Rv=64$$

$$Go=Gv=2 \text{ and}$$

$$Bo=Bv=-60 \text{ are obtained.}$$

Originally, in a monochrome image, R=G=B should be satisfied; however, the calculated color signals have relationship such as Ro≠Go≠Bo. This means that moiré signals are generated.

The following describes this in further detail.

In the interpolation processing using color correlations disclosed in Japanese Patent No. 2931520, the color components other than G for the target pixel are calculated according to the correlation between the G component and each of the color components other than G, making use of the characteristic that a G component is always, included in the vertical direction and the horizontal direction of the color filters arranged in a Bayer array. For example, the following is an explanation in which the horizontal direction in FIG. 12A is used as an example.

As shown in FIG. 12A, the horizontal line that includes the target pixel G33 contains Gs and Qs. Accordingly, it is possible to calculate Q33, which is the Q component of the target pixel, using these values of Gs and Qs. In addition, another horizontal line that is positioned right above the horizontal line and includes P32 contains Gs and Ps. Accordingly, it is possible to calculate G32, which is the G component of the target pixel, using these values of Gs and Ps.

According to the interpolation processing method disclosed in Japanese Patent No. 2931520, as mentioned above, focus is given to the pixels P32 and G33 shown in FIG. 12A, P33 is calculated with the use of either the characteristic that the differences between pairs of a G and a P in the local are substantially equal to each other, i.e. "P33=G33=P32−G32", or the characteristic that the ratios in pairs of a P and a G in the local area are substantially equal to each other, i.e. "P33/G33=P32/G32".

Since an image in general has edges in various directions, it is preferable, in terms of detecting directions, to detect a larger number of directions than only two directions, namely the vertical direction and the horizontal direction.

According to the interpolation processing method disclosed in Japanese Patent No. 2931520, however, it is not possible to perform an interpolation processing while the color correlations in the diagonal directions are taken into account.

The reason for this is because, for example in FIG. 12A, there are only G components diagonally at the angle of 45 degrees, and, for example in FIG. 128, there are only P components and Q components (B components and R components) diagonally at the angle of 45 degrees.

The present invention aims to solve the problem in the conventional technique and to provide an image processing apparatus, an imaging apparatus including the image processing apparatus, an image processing method corresponding to the image processing apparatus, an image processing program for having a computer execute the image processing method, and a computer-readable recording medium on which the image processing program is recorded. Bach of which makes it possible to further restrain occurrence of moiré signals with the use of correlations between color signals with respect to edges in a plurality of directions including a diagonal direction, when all color signals for each pixel are generated from color signals output from a solid state image pickup device in which color filters for a plurality of colors are separately arranged in each pixel section, for example, in a Bayer array, through an interpolation processing using color signals for the target pixel and a pixel in the vicinity thereof.

SUMMARY OF THE INVENTION

An image processing apparatus according to the present invention includes: a data interpolation section for generating a color signal for each pixel using data interpolation processing of color signals for a target pixel and at least one pixel within a vicinity of the target pixel, based on color signals output from a solid state image pickup device, the solid state image pickup device including a plurality of pixel sections on which a plurality types of color filters are separately-arranged, wherein the data interpolation section includes; a direction data calculation means for calculating a plurality of direction data, each of the plurality of direction data indicating a directional amount along a corresponding one of a plurality of directions including a diagonal direction within the vicinity of the target pixel; a direction detection means for detecting at least one direction of an edge within the vicinity of the target pixel, by using the plurality of direction data calculated by the direction data calculation means; a direction color signal calculation means for calculating at least one color signal corresponding to the at least one direction of the edge detected by the direction detection means: and a target pixel color signal calculation means for calculating a color signal for the target pixel, by using the at least one color signal calculated by the direction color signal calculation means.

An Imaging apparatus according to the present invention includes: a solid state image pickup device operable to pick up an image of an object; an, analog/digital conversion section operable to perform an analog/digital conversion on image pickup data output from the solid state image pickup device; and an image processing apparatus described above which is operable to perform a signal processing on a digital signal output from the analog/digital conversion section.

An image processing method according to the present invention is provided for generating a color signal for each pixel using data interpolation processing of color signals for a target pixel and at least one pixel within a vicinity of the target pixel, based on color signals output from a solid state image pickup device, the solid state image pickup device including a plurality of pixel sections on which a plurality types of color filters are separately arranged. The image processing method includes: a direction data calculation step of calculating a-plurality of direction data, each of the plurality of direction data indicating a directional amount along a corresponding one of a plurality of directions including a diagonal direction within the vicinity of the target pixel; a direction detection step of detecting at least one direction of an edge within the vicinity of the target pixel, by using the plurality of direction data calculated in the direction data calculation step; a direction color signal calculation step of calculating at least one color signal corresponding to the at least one direction of the edge detected in the direction detection step; and a target pixel color signal calculation step of calculating a color signal for the target pixel, by using the at least one color signal calculated in the direction color signal calculation step.

An image processing program according to the present invention is provided for having a computer execute the steps in the image processing method described above.

A computer-readable recording medium according to the present invention is provided on which the image processing program described above is recorded.

The following describes how the present invention works with the configuration mentioned above.

As mentioned above, an image in general has the characteristic in a local area such as "the difference among G, R, and B and the ratio among G. R, and B are substantially regular because the local variation of the color signal is small".

According to the conventional interpolation processing method, interpolation processing is performed with the use of the color correlations in the horizontal direction and the vertical directions, utilizing the aforementioned characteristic of a local area in an image, and another characteristic that a G component is always included in both the vertical direction and the horizontal direction of a Bayer array, In contrast, according to the present invention, interpolation processing is performed not only utilizing the characteristic of a local area of an image like in the conventional method, but also an interpolation processing in a diagonal direction is performed by focusing on pixels in a wider range rather than just in the diagonal direction, and if necessary, a color signal is calculated using an arbitrary point (for example, an intersection point of two pixels) rather than always using the center of a pixel, and the color signal of a target pixel is thereby calculated according to the calculated color signal and the color correlation. Thus, according to the present invention, the interpolation processing is performed utilizing also the correlations of color signals fox the edges in diagonal directions.

As explained by this example, when an interpolation processing is performed on a Bayer array, it is possible to further restrain the occurrence of moiré signals when a larger number of directions are checked for and the color signals are calculated 80 as to fit each of the directions, because errors in the color signals are reduced.

In other words, according to the present invention, it is possible to calculate color signals using color correlations in diagonal directions. Consequently, it is possible to more precisely detect the directions of an image than in a conventional interpolation processing method where only color correlations in the vertical and horizontal directions are used. Thus, it is possible to calculate color signals while the occurrence of moiré signals is restrained.

Further, by detecting directions in eight directions around the target pixel, and calculating color signals using the color correlations, it is possible to perform an interpolation processing with an even smaller number of moiré signals while the terminal points of edges are taken into account.

Further, by using a color signal calculated utilizing the characteristic of color correlations in calculation of a color signal further utilizing a color relation, it is possible to further reduce moiré signals.

As described above, according to the present invention, an interpolation processing is performed utilizing not only the characteristic in a local area of an image but also correlations of color signals with respect to an edge in a diagonal direction, it is possible to calculate color signals while the occurrence of moiré signal is further restrained.

Further, by detecting directions in eight directions around the target pixel so as to calculate color signals, it is possible to perform interpolation processing with an even smaller number of moiré signals.

Further, by using a color signal calculated utilizing the characteristic of color correlations in calculation of a color signal further utilizing a color relation, it is possible to further reduce moiré signals.

These and other advantages of the present invention will become apparent to those skilled in the art upon reading and understanding the following detailed description with reference to the accompanying figures.

BRIEF DESCRIPTION OF THE DRAWINGS

FIG. 7 is a plan view showing the positions of pixels in a Bayer array in a case where the color component of the target pixel is G, R, or B.

Figure 11:
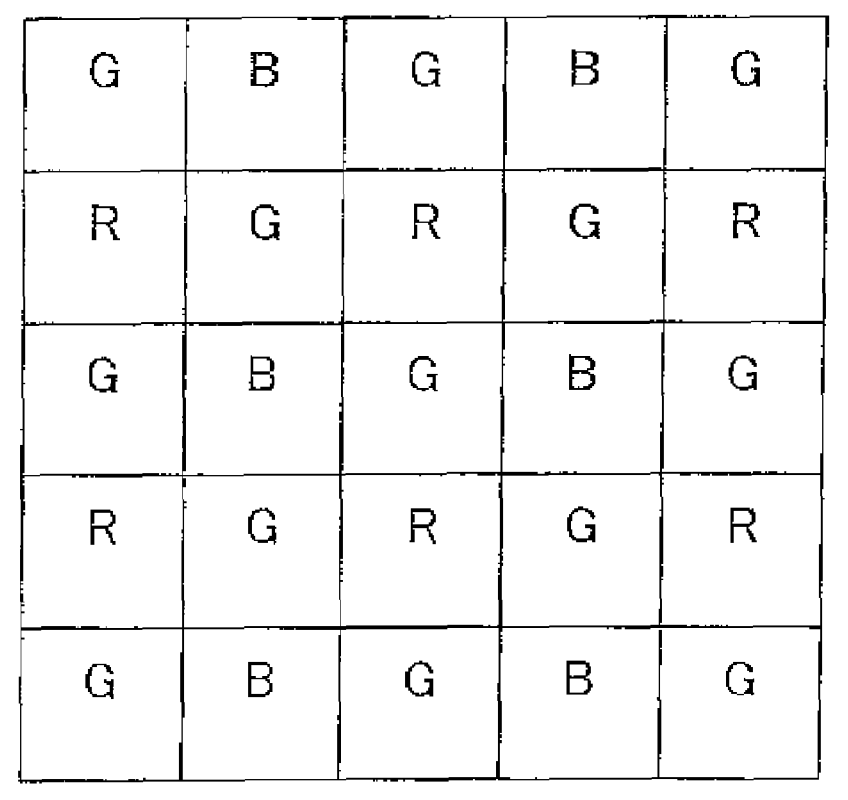

FIG. 11 is a plan view showing an example of a color filter array arranged in a Bayer array.

FIG. 12A is a plan view showing a Bayer array in a case where the color component of a target pixel in G.

FIG. 12B is a plan view showing a Bayer array in a case where the color component of a target pixel is either R or B.

FIG. 13A is a plan view showing an example of a set of color signal values (luminance data) of an solid state image pickup device.

FIG. 13B is a plan view showing an example of an arrangement of color filters in a Bayer Array for the pixels.

DESCRIPTION OF THE PREFERRED EMBODIMENTS

The following describes in detail the cases where the first through fifth embodiments of an image processing apparatus according to the present invention are applied to an imaging apparatus, with reference to the drawings.

First Embodiment

Figure 1:
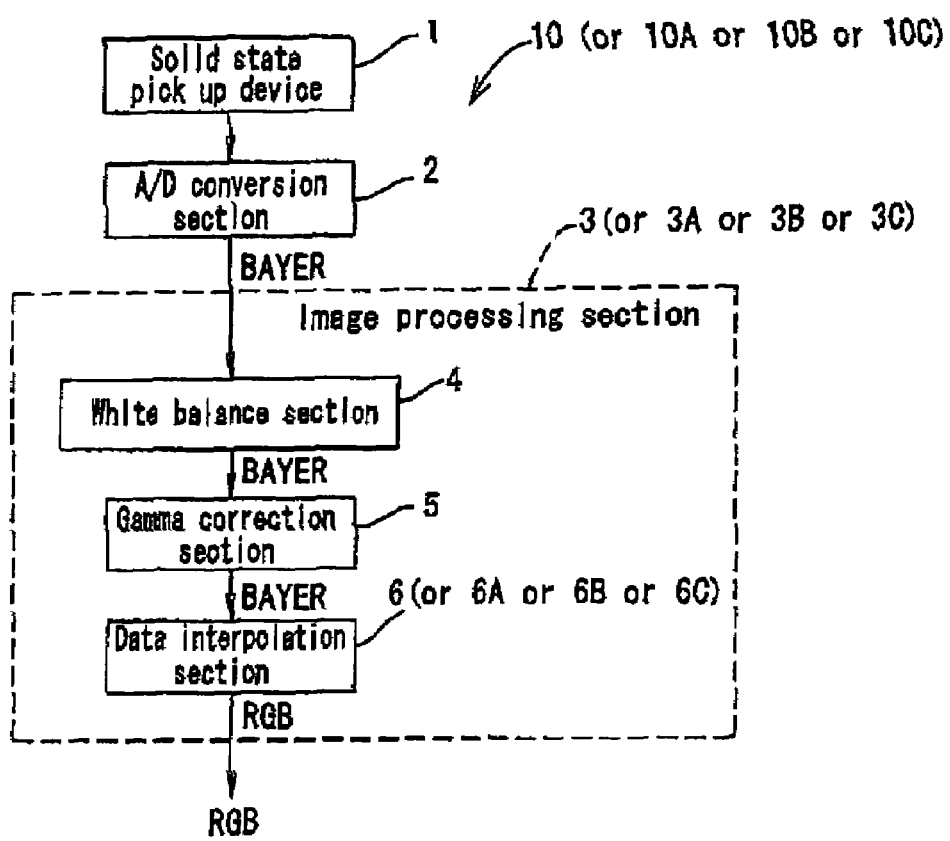
FIG. 1 is a block diagram showing an exemplary configuration of the image processing apparatuses according to the first through fourth embodiments of the prevent invention.

FIG. 1 is a block diagram that shows an example of a configuration of an imaging apparatus in which a first embodiment of the image processing apparatus according to the present invention is used.

As shown in FIG. 1, an imaging apparatus 10 in the first embodiment comprises: a solid state image pickup device 1 that is operable to pick up an image of an object; an A/D conversion section 2 that performs an A/D conversion on image pickup date output from the solid state image pickup device 1: and an image processing section 3 that serves as an image processing apparatus operable to perform various types of signal processing on digital signals output from the A/D conversion section 2.

In the solid state image pickup device 1, light from an object enters a photodiode section through a predetermined color filter (not shown), and the light is subject to a photoelectric conversion by the photodiode section, to be converted into an analog electric signal indicating the size of the color corresponding to each pixel, which is then output from the solid state image pickup device 1. It should be noted that the color filters used in the present example are for the three primary colors of R, G, and B, and are arranged in a Bayer array.

An analog electric signal output from the solid state image pickup device 1 is converted into a digital signal (hereafter, referred to as Bayer data) in the A/D conversion section 2 and output from the A/D conversion section 2.

The image processing section 3 includes: a white balance section 4, a gamma correction section 5, and a data interpolation section 6. Bayer data output from the A/D conversion section 2 is inputted to the image processing section 3 where various types of image processing are performed such as white balance, gamma correction, and data interpolation, so that image data which includes all data for RGB collected from each pixel section is output from the image processing section 3.

Bayer data output from the A/D conversion section 2 is inputted to the white balance section 4 so that the balances of white colors are adjusted by multiplication of a corresponding RGB gain on each of pixel values in the Bayer data. The Bayer-data in which the white balance has been adjusted is output from the white balance section 4.

The Bayer data in which the white balance has been adjusted and which is output from the white balance section 4 is inputted to the gamma correction section 5 where an adjustment (called a gamma correction) is made to each of the pixel values in the Bayer data with respect to the gray-scale of the luminance in correspondence with a display section. The Bayer data in which the gamma correction has been made is output from the gamma correction section 5.

The Bayer data in which the gamma correction has been made and which is output from the gamma correction section 5 is inputted to the data interpolation section 6 so that, for each of the pixel sections that are two-dimensionally arranged in a matrix pattern, a calculation processing is performed using color signals of a target pixel and vicinity pixels so as to detect whether or not an edge (a portion in which luminance values drastically change and which is other than a flat portion) exists in the vicinity of the target pixel and to detect what the directions of the edge are. A data interpolation processing is performed in accordance with the detection result as to whether or not an edge exists and what the directions of the edge are, and an RGB signal for each pixel is output from the data interpolation section 6.

Figure 2:
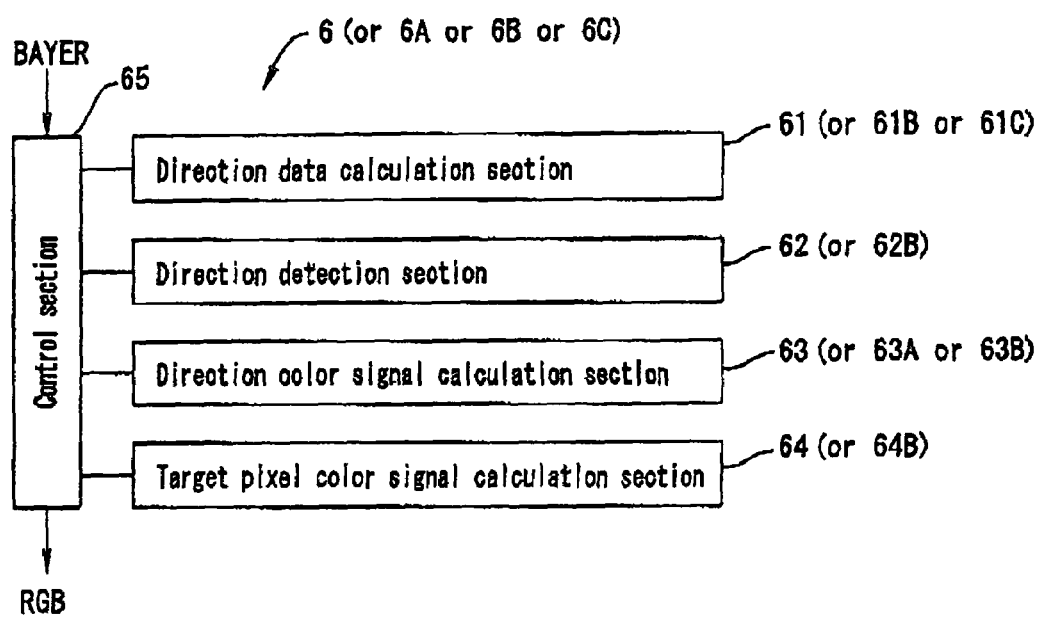
FIG. 2 is a block diagram showing an exemplary detailed configuration of the data interpolation section shown in FIG. 1.

FIG. 2 is a block diagram showing an example of a configuration of the date interpolation section 6 shown in FIG. 1.

As shown in FIG. 2, the data interpolation section 6 includes: a direction data calculation section 61, a direction detection section 62, a direction color signal calculation section 63, a target pixel color signal calculation section 64, and a control section 65 for controlling the respective sections. The data interpolation section 6 detects whether or not an edge exists and what the directions of the edge are, and performs data interpolation processing in accordance with the detected directions of the edges. A direction data calculation means is configured by the direction data calculation section 61 and the control section 65. A direction detection means is configured by the direction detection section 62 and the control section 65. A direction color signal calculation means is configured by the direction color signal calculation section 63 and the control section 65. A target pixel color signal calculation means is configured by the target pixel color signal calculation section 64 and the control section 65.

The direction data calculation section 61 calculates a plurality of direction data for each pixel in the Bayer data. Each of the plurality of direction data is calculated for a different one of a plurality of predetermined directions including a diagonal direction. Each of the plurality of direction data has a value which smaller as the similarity between one of the plurality of predetermined directions and an actual edge direction within the vicinity of the target pixel is larger.

The direction detection section 62 detects whether or not an edge exists within the vicinity of the target pixel (i.e. a portion passing through the target pixel and including at least one pixel within the vicinity of the target pixel) and at least one direction of the edge, by using the plurality of direction date for the plurality of predetermined directions calculated by the direction data calculation section 61.

The direction color signal calculation section 63 calculates at least one color signal corresponding to the at least one direction of the edge detected by the direction detection section 62. In the first embodiment, the direction color signal calculation section 63 includes: a color difference calculation section (not shown in the drawing) which serves as a color difference calculation means for calculating a difference between color signals for two different colors at an arbitrary point (a position on a screen) in the vicinity of the target pixel in view of the plurality of directions, and a color signal calculation section (not shown in the drawing) which serves as a color signal calculation means for calculating a color signal using a correlation of the difference between the color signals calculated by the color difference calculation section.

The target pixel color signal calculation section 64 calculates a color signal for the target pixel using the at least one direction of the edge detected by the direction detection section 62 and the at least one color signal calculated by the direction color signal calculation section 63.

The control section 65 is connected to the direction data calculation section 61, the direction detection section 62, the direction color signal calculation section 63 and the target pixel color signal calculation section 64, respectively. The control section 65 controls the flow of the processing performed by the respective sections.

Figure 3:
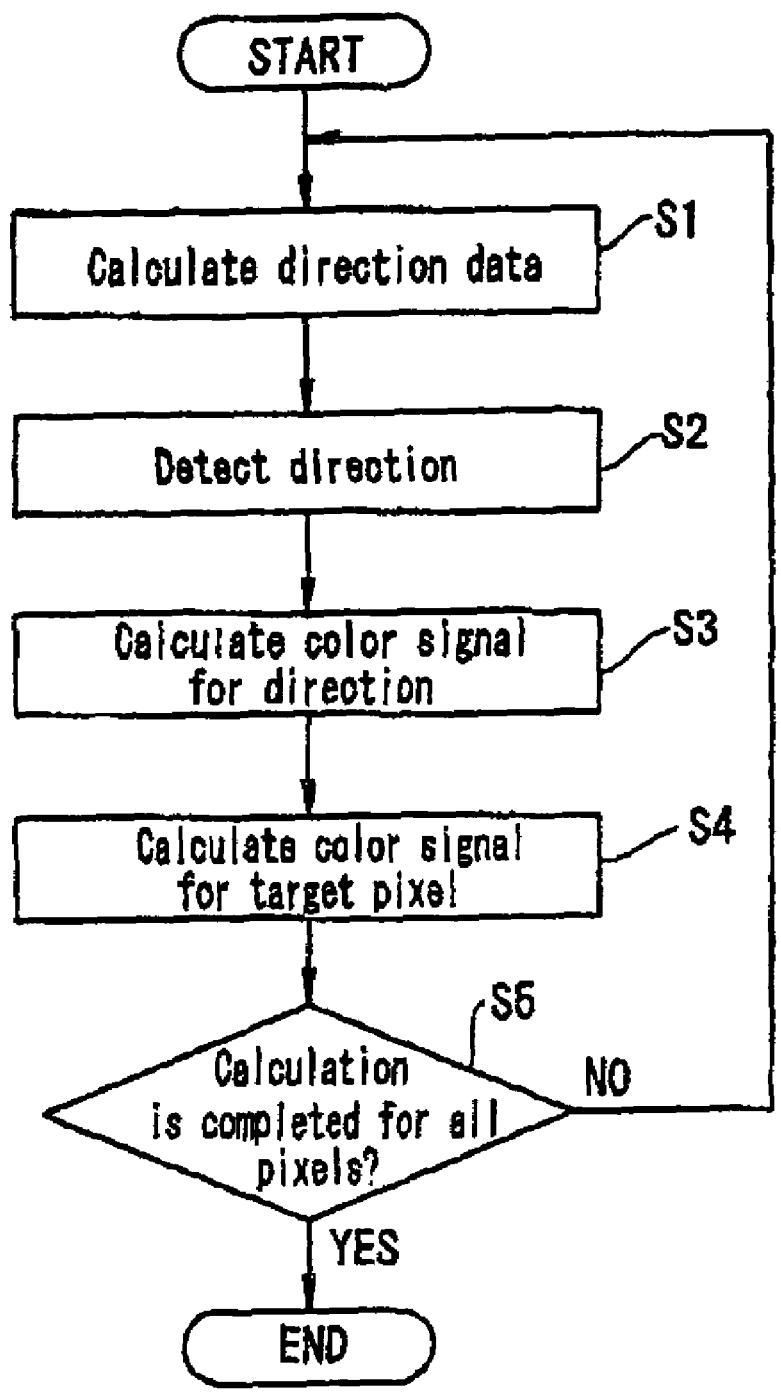
FIG. 3 is a flowchart for explaining an example of an interpolation processing operation performed by the data interpolation section shown in FIG. 2.

The following sequentially describes the processing procedure of the data interpolation processing performed by the data interpolation section 6 shown in FIGS. 1 and 2, with reference to FIG. 3.

Figure 4:
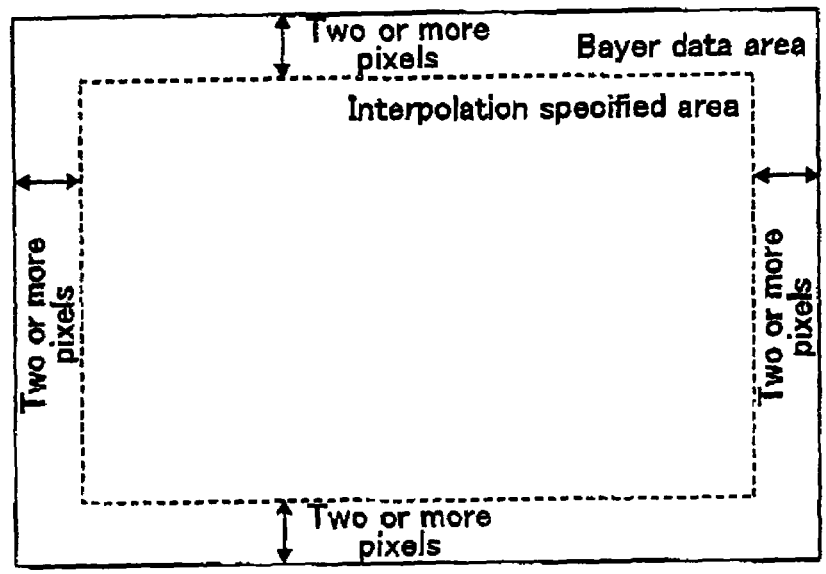
FIG. 4 is a plan view for explaining an interpolation specified area within an inputted Bayer data area.

FIG. 3 is a flowchart for explaining a data interpolation operation performed by the data interpolation section 6 shown in FIG. 2. It should be noted that the processing in Steps S1 through S4 in FIG. 3 is repeated in Step S5 as many times as the number of the pixels in an interpolation specified area within an inputted Bayer data area. Further, as shown in FIG. 4, an interpolation specified area defined by a broken line is within the Bayer data area defined by a solid line. There is an arrangement wherein there are a plurality of Bayer data having a width of two pixels or more on the outside of the interpolation specified area, at the top, at the bottom, on the right, and on the left. This arrangement is made so that it is possible to obtain sufficient information of vicinity pixels required for an interpolation processing of a pixel positioned in a boundary area of the interpolation specified area.

As shown in FIG. 3, in Step S1, the direction data calculation section 61 calculates a plurality of direction data for each target pixel. Each of the plurality of direction data is calculated for a different one of the plurality of predetermined directions.

Figure 5:
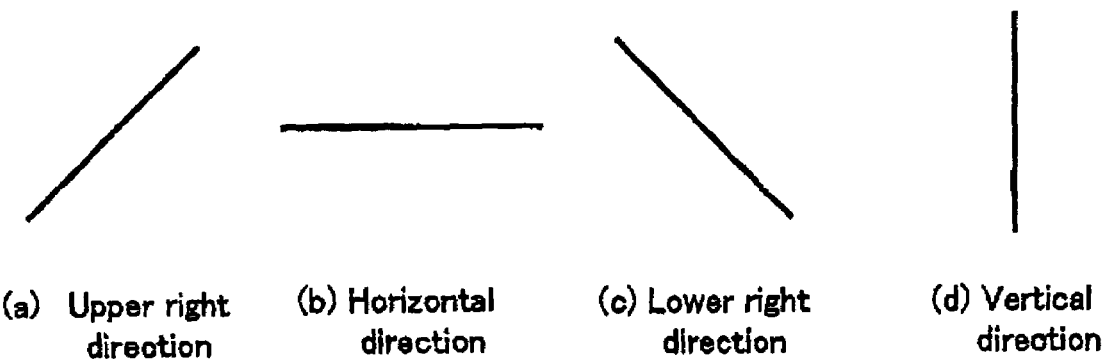
FIG. 5 is a schematic drawing showing four predetermined directions used in the first and second embodiments of the present invention.

In the first embodiment, as shown in FIG. 5, the plurality of predetermined directions are four directions such as upper right, horizontal, lower right and vertical directions. However, it is not necessary that the predetermined directions are limited to these four directions. It is acceptable to use any direction other than these four directions. However, in an extremely small area, it is possible to approximate any angle to one of these four directions.

In addition, in the first embodiment, as shown in FIG. 12A, eight vicinity pixels that are positioned adjacent to a target pixel as well as sixteen more vicinity pixels that are positioned so as to surround the eight vicinity pixels are used as the plurality of vicinity pixels positioned near the target pixel; however, the present invention is not limited to this arrangement, and it is possible to use any arbitrary number of vicinity pixels, as long as the number of pixels is sufficient for performing data interpolation processing and also the vicinity pixels are positioned so as to surround the target pixel.

The direction data calculation section 61 calculates the plurality of direction date by quantifying directions of an edge with respect to the plurality of predetermined directions (four directions in the present example) including upper right, horizontal, lower right and vertical directions in the vicinity of the target pixel. Specifically, the direction data calculation section 61 calculates the plurality of direction data, such that each of the plurality of direction data has a value depending on the similarity between one of the plurality of predetermined directions and an actual edge direction within the vicinity of the target pixel. For example, the direction data calculation section 61 calculates the plurality of direction data, such that each of the plurality of direction data has a value which is smaller an the similarity between one of the plurality of predetermined directions and an actual edge direction within the vicinity of the target pixel is larger. There may be various types of formulae for calculating the plurality of direction data. For example, the following formulae <Formulae 2> can be used to calculate the plurality of direction data.

It should be noted that in the formulae below, the words have the following meanings:

DDru denotes the formula for calculating direction data for the upper right direction.

DDho denotes the formula for calculating direction data for the horizontal direction.

DDrd denotes formula for calculating direction data for the lower right direction.

DDve denotes the formula for calculating direction data for the vertical direction.

<Formulae 2>

In the case where the target pixel is G33 (See FIG. 12A):

$$DDru = \{(|G51 - G33| + |G42 - G33| + |G24 - G33| + |G15 - G33| +$$
$$|G22 - G31| + |G22 - G13| + |G44 - G53| + |G44 - G35|)/2 +$$
$$(|P32 - P14| + |P52 - P34|) + (|Q41 - Q23| + |Q43 - Q25|)\}/2$$

-continued $$DDho = \{(|G13-G33|+|G53-G33|+|G22-G42|+|G24-G44|) +$$
$$(|Q23-Q43|) \times 2 +$$
$$(|P12-P32|+|P52-P32|+|P14-P34|+|P54-P34|)/2\}/2$$

$$DDrd = \{(|G11-G33|+|G22-G33|+|G44-G33|+|G55-G33| +$$
$$|G42-G31|+|G42-G53|+|G24-G13|+|G24-G35|)/2 +$$
$$(|P32-P54|+|P12-P34|)+(|Q21-Q43|+|Q23-Q45|)\}/2$$

$$DDve = \{(|G31-G33|+|G35-G33|+|G22-G24|+|G42-G44|) +$$
$$(|P32-P34|) \times 2 +$$
$$(|Q21-Q23|+|Q25-Q23|+|Q41-Q43|+|Q45-Q43|)/2\}/2$$

In the case where the target pixel is P33 (See FIG. 12B):

$$DDru = (|P15-P33|+|P51-P33|) +$$
$$(|Q42-Q24|)+(|G32-G23|+|G43-G34|)/2$$

$$DDho = (|P13-P33|+|P53-P33|)+(|G23-G43|) +$$
$$(|Q22-Q42|+|Q24-Q44|)/2$$

$$DDrd = (|P11-P33|+|P55-P33|+(|Q44-Q22|) +$$
$$(|G32-G43|+|G23-G34|)/2$$

$$DDve = (|P31-P33|+|P35-P33|)+(|G32-G34|) +$$
$$(|Q22-Q24)+|Q42-Q44|)/2$$

Now, with reference to FIG. 3, in Step S2, the direction detection section 62 detects whether or not an edge of the target pixel exists and, if any, the directions of the edge, by the use of the plurality of direction data calculated in Step S1.

Figure 6:
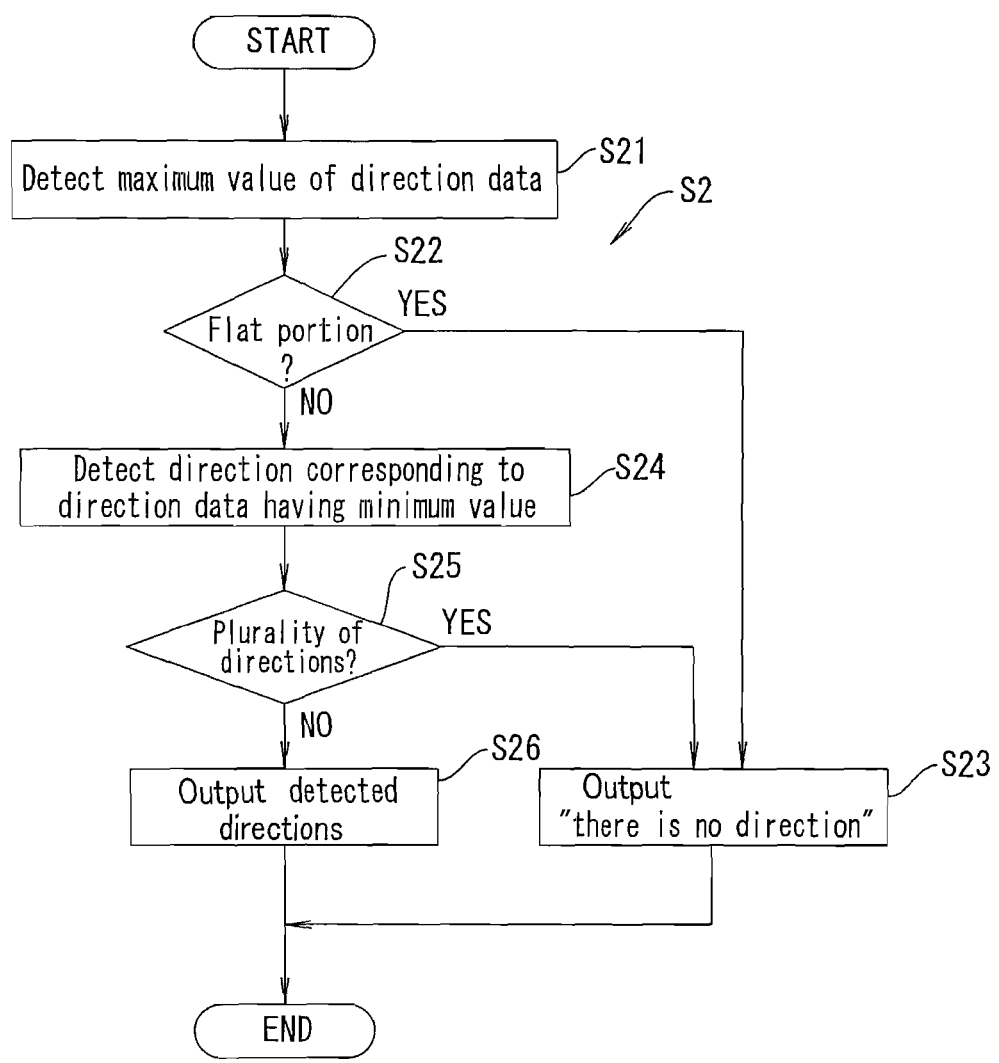
FIG. 6 is a flowchart for explaining an example (the first and second embodiments) of direction detection processing operation performed by the direction detection section shown in FIG. 2.

The following describes the processing procedure of the direction detection processing performed by the direction detection section 62 in FIG. 2, with reference to FIG. 6.

FIG. 6 is a flowchart describing an example of the operation (an example of Step S2 in FIG. 3) performed by the direction detection section 62 in FIG. 2.

As shown in FIG. 6, in Step S21, the direction detection section 62 detects the maximum value of the four direction data shown in FIG. 5 calculated in Step S1 of FIG. 3.

In Step S22, it is determined whether or not the maximum value of the plurality of direction data detected in Step S21 is smaller than a threshold value A, which is stored in a register (not shown).

Thus, it is determined whether or not a gradient of luminance is so flat that no edge exists within the vicinity of the target pixel. In the case where it is determined that the gradient of luminance is flat ("YES" in Step S22), a signal indicating that "there is no direction" is output in Step S23, and the direction detection processing for the target pixel is completed. On the other hand, in the case where it is determined that the gradient of luminance is not flat (i.e. there exists an edge portion) ("NO" in Step S22), the determination result is "there is at least one direction" and the procedure proceeds to Step S24.

In this manner, in Step S22, by detecting whether or not the gradient of luminance is flat within the vicinity of the target pixel, it es detected whether or not an edge exists. It should be noted that, in this case, the range of the threshold value A varies depending on the formulae for calculating the plurality of direction data. In general, the larger the threshold value A is, the more pixel data are determined to be in a flat portion, whereas the smaller the threshold value A is, the fewer pixel data are determined to be in a flat portion.

In Step S24, a direction corresponding to the direction data having the minimum value is detected from among the four direction data calculated in Step S1.

In Step S25, it is determined whether or not there are plurality of directions corresponding to the direction data having the minimum value. In the case where there are plurality of directions corresponding to the direction data having the minimum value ("YES" in Step S25), the procedure proceeds to Step S23. In Step S23, a signal indicating that "there is no direction" is output, and the direction detection processing for the target pixel is completed. On the other hand, in the case where there are not a plurality of directions corresponding to the direction data having the minimum value ("NO" in Step S25), the procedure proceeds to Step S26.

In Step S26, the direction corresponding to the direction data having the minimum value detected in Step S24 is output, and the direction detection processing for the target pixel is completed.

Now, with reference to FIG. 3, in Step S3, the direction color signal calculation section 63 calculates a color signal that corresponds to each edge direction (each of the directions of the edge) detected by the direction detection section 62. Since the calculation processing of direction color signals to be performed by the direction-color signal calculation section 63 is the characteristic configuration of the first embodiment, it will be described later in detail.

In Step S4, the target pixel color signal calculation section 64 calculates the color signal calculated by the direction color signal calculation section 63 in Step S3, as a color signal of the target pixel. For a pixel with which the direction detection section 62 has determined that "there is no direction" in Step S2, the color signal is calculated with the use of the bilinear method.

By the processing in step 5, the processing in Steps S1 to S4 is repeated until the interpolation processing is completed for all of the pixels.

The following describes in detail the method of calculating color signals, which is used by the direction color signal calculation section 63 (in Step S3 shown in FIG. 3).

There are many different methods for calculating a color signal for each of the edge directions; however, in the present example, explanation is provided for color signal calculation formulae for a vertical direction and an: upper right direction. A color signal calculation formula for a horizontal direction can be obtained by rotating the color signal calculation formula for the vertical direction by 90 degrees. In a similar manner, the color signal calculation formula for a lower right direction can be obtained by rotating the color signal calcu- lation formula for the upper right direction by 90 degrees.

<Formulae 3> shown below are examples of color signal calculation formulae that may be used by the direction color signal calculation section 63.

<Formulae 3>

In the case where the target pixel is G33 (See FIG. 12A):

$$Gve = G33$$
$$Pve = (P32+P34)/2$$
$$Qve = G33+(Q23-G23'+Q43-G43')/2$$

where
$G23'=(G22+G24)/2$
$G43'=(G42+G44)/2$
$Gru=(2 \times G33+G42+G24)/4$ $Pru=Gru+(P32-G32'+P34-G34')/2$ $Qru=Gru+(Q23-G23'+Q43-G43')/2$ In the case where the target pixel is P33 (See FIG. 12B):

$Qve=(G32+G34)/2$ $Pve=P33$ $Qve=Gve+(Q23'-G23+Q43'-G43)/2$ where $G32'=(G22+G42)/2$ $G34'=(G24+G44)/2$ $G23'=(G22+G24)/2$ $G43'=(G42+G44)/2$ where $Q23'=(Q22+Q24)/2$ $Q43'=(Q42+Q44)/2$ $Pru=P33$ $Qru=(Q42+Q24)/2$ $Gru=S33+(Ga-Sa+Gb-Sb)/2$ where $S33=(2\times P33+Q42+Q24)/4$ $Sa=(P33+Q22)/2$ $Ga=(G32+G23)/2$ $Sb=(P33+Q44)/2$ $Gb=(G34+G43)/2$ Gve denotes the G component color signal for a vertical direction.

Pve denotes the P component color signal for the vertical direction.

Qve denotes the Q component color signal for the vertical direction.

Gru denotes the G component color signal for the upper right direction.

Pru denotes the P component color signal for the upper right direction.

Qru denotes the Q component color signal for the upper right direction.

The following explains how <Formulae 3> above are obtained:

Firstly, explanation is provided on how to obtain a color signal for a vertical direction (in the case where the detected edge direction is a vertical direction) in the case where the target pixel is a G component. Secondly, explanation is provided on how to obtain a color signal for a vertical direction in the case where the target pixel is a P component. Thirdly, explanation is provided on how to obtain a color signal for the upper right direction (in the case where the detected edge direction is the upper right direction) in the case where the target pixel is a G component. Lastly, explanation is provided on how to obtain a color signal for the upper right direction in the case where the target pixel is a P component.

Firstly, the following explains how to obtain the color signal calculation formulae, <Formulae 3> for a vertical direction in the case where the target pixel V33 is a G component, with reference to FIG. 7 and FIG. 12A which show the positions of pixels.

In <Formulae 3> shown above, the G component, the R component, and the B component of the color signal for the vertical direction are expressed by Gve, Pve, and Qve respectively. It should be noted that Pve may be either the R component or the B component; and Qve may be either the B component or the R component.

As for Gve, which is a G signal for the target pixel V33, the value G33 is used.

As for Pve, which is a P signal for the target pixel V33, the average of the pixel components of the pixels positioned next to V33 in the vertical direction, namely V32 and V34, is used.

As for Qve, which is a Q signal for the target pixel V33, calculation is based on the correlation related to a difference between color signals in the vertical direction.

Here, the correlation related to a difference between color signals refers to the characteristic such as "in a local area, the variation of the color signal is small, and the difference between different color components is substantially regular." Specifically, Q' and G' which are the Q and G components of the vicinity pixels are calculated while the directions are taken into account, and then Q, which is the Q component of the target pixel, can be obtained with the use of <Formulae 4> shown below, based on the relation between Q and G, which are the Q and G components of the target pixel. The P component can be also obtained in the same manner.

$Q=G+(Q'-G')$ $P=G+(P'-G')$ <Formulae 4>

Here, focus is given to the pixels V23, V43, and V33, and it is assumed that the difference between the G component G23' and the Q component Q23 in the pixel V23, the difference between the G component G43' and the 0 component Q43 in the pixel V43, and the difference between the G component Q33 and the Q component Q33 in the pixel V33 are all substantially equal. The average of the difference between the Q component and the G component in the pixel V23 and the difference between the Q component and the G component in the pixel V43 is calculated by (Q'-G') shown in <Formulae 4> above, so that Q33, which is the Q component in the target pixel V33, is calculated.

The following explains how to obtain the color signal calculation formulae, <Formulae 3> for a vertical direction in the case where the target pixel V33 is a P component, with reference to FIG. 7 and FIG. 12B which show the positions of pixels.

As for Gve, which is a G signal for the target pixel V33, the average of the pixel components of the pixels positioned next to V33 in the vertical direction, namely V32 and V34, is used.

As for Pve, which is a P signal for the target pixel V33, the value P33 is used.

As for Qve, which is a Q signal for the target pixel V33, calculation is based on the correlation related to a difference between color signals in the vertical direction, just like in the case where the target pixel is a G component.

Here, focus is given to the pixels V23, V43, and V33, and it is assumed that the difference between the G component G23 and the Q component Q23' in the pixel V23, the difference between the G component G43 and the Q component Q43' in the pixel V43, and the difference between the G component Gve and the Q component Q33 in the pixel V33 are all substantially equal. The average of the difference between the Q component and the G component in the pixel V23 and the difference between the Q component and the G component in the pixel V43 is calculated by (Q'-G') shown in <Formulae 4> above, so that Q33, which is the Q component in the target pixel V33, is calculated.

The following explains how to obtain the color signal calculation formulae. <Formulae 3> for the upper right direction in the case where the target pixel V33 is a G component, with reference to FIG. 7 and FIG. 12A which show the positions of pixels.

In <Formulae 3> shown above, the G component, the R component, and the B component of the color signal for the upper right direction are expressed by Gru, Pru, and Qru respectively. It should be noted that Pru may be either the R component or the B component; and Qru may be either the B component or the R component.

Gru, which is the G component of the target pixel V33, is calculated from the pixels V33, V42, and V24.

As for Pru and Qru, which are the P component of the target pixel V33 and the Q component of the target pixel V33, calculation is based on the correlation related to a difference between color signals in the upper right direction.

The following explains how to calculate the color signal using the color correlations, with regard to the P component of the target pixel V33.

Here, focus is given to the pixels V32, V34, and V33, and it is assumed that the difference between the P component P32 and the G component G32' in the pixel V32, the difference between the P component P34 and the G component G34' in the pixel V34, and the difference between the P component P33 and the G component G33 in the pixel V33 are all substantially equal.

One of the main characteristic configurations of the present invention lies in how to calculate the G components G32' and G34'. According to the conventional method, in order to calculate the G component for the upper right direction of the pixel V32, the pixels positioned in the upper right direction which includes the pixel V32 are used in the calculation. However, since only P and Q components exist in the upper right direction which includes the pixel V32, it is not possible to calculate a G component.

In contrast, in the first embodiment of the present invention, the characteristic lies in that, in order to calculate G32', which is the G component of the pixel V32, pixels other than the pixels positioned in the upper right direction are referenced.

For example, as the value of G32', which in the G component in the pixel V32, the average of the G component G22 and the G component G42 is used. In the same manner, as the value of G34', which is the G component in the pixel V34, the average of the G component G24 and the G component G44 is used.

Like the color correlations in the vertical direction, with the use of the G components calculated in this manner, the average of the difference between the P component and the G component in the pixel V32 and the difference between the P component and the G component in the pixel V34 in calculated by (P'−G') shown in <Formulae 4> above, so that P33, which is the P component in the target pixel V33 is calculated.

The following explains how to calculate the color signal using the color correlations, with regard to the Q component of the target pixel V33. Basically, the color signal for the Q component is calculated in the same manner as that for the P component is calculated.

Here, focus is given to the pixels V23, V43, and V33, and it is assumed that the difference between the a component Q23 and the G component G23 in the pixel V23, the difference between the Q component Q43 and the G component G43' in the pixel V43, and the difference between the Q component Q33 and the G component G33 in the pixel V33 are all substantially equal.

For example, the average of the difference between the Q component and the G component in the pixel V23 and the difference between the Q component and the Q component in the pixel V43 is calculated by (Q'−G') shown in <Formulae 4> above, so that Q33, which is the Q component in the target pixel V33 is calculated.

Lastly, the following explains how to obtain the color signal calculation formulae, <Formulae 3> for an upper right direction in the case where the target pixel V33 is a P component, with reference to FIG. 7 and FIG. 12B which show the positions of pixels.

As for Pru, which is the P component of the target pixel V33, the value P33 is used.

As for Qru, which is the Q component of the target pixel V33, the average of the pixel values of the pixels positioned adjacent to V33 in the upper right direction, namely V42 and V24, is used.

As for Gru, which is the G component of the target pixel V33, calculation is based on the correlation related to a difference between color signals in the upper right direction.

In FIG. 7, the intersection point, (a position) of four pixels, namely the pixel V22, the pixel V32, the pixel V23, and the pixel V33, is referred to as Point A. The intersection point (a position) of four pixels, namely the pixel V33, the pixel V43, the pixel V34, and the pixel V44, is referred to as Point B.

Here, focus is given to the positions of Point A and Point B in addition to the pixel V33. It in assumed that the difference between the average S33 of the P and Q components and the G component G33 in the pixel V33, the difference between the average Sa of the P and Q components and the G component Ga at Point A, and the difference between the average Sb of the P and Q components and the G component Gb at Point B are all substantially equal.

Here, based on the correlation related to the difference between color signals in a local area, <Formulae 5> below is obtained, in the same manner as <Formulae 4> above.

$$G = S + (G' - S') \qquad \text{<Formulae 5>}$$

where

G denotes the G component of the target pixel,

S denotes the average of the P component and the Q component of the target pixel, G' denotes the G component at a point in the vicinity of the target pixel, S' denotes the average of the P component and the Q component at a point in the vicinity of the target pixel, and the point in the vicinity of the target pixel in G' is identical to that in S'.

Accordingly, the average of the difference between the value S and the G component at Point A and the difference between the value S and the G component at Point B is calculated by (G'−S') shown in <Formulae 5> above, so is that G33, which is the G component in the target pixel V33, is calculated.

As described above, according to the first embodiment, it is possible to perform interpolation processing with the use of correlations of color signals with respect to edges in diagonal directions, as well as with the use of the characteristics in local areas of images. Since it is possible to calculate color signals with the use of color correlations in diagonal directions, it is possible to calculate the color signals by detecting directions of the images more precisely than the conventional interpolation processing method in which color correlations in the vertical and horizontal directions are used.

For example, in a Bayer array having the luminance values shown in FIG. 13A, in the case where focus is given to the target pixel G33 and the direction data calculation formulae, <Formulas 2> according to the first embodiment are used, the following values are obtained:

DDru=248

DDho=744

DDrd=744

DDve=434

In this case, the direction detection section 62 detects a direction corresponding to the direction data having the minimum value (i.e. DDru; an upper right direction) as an edge direction in the vicinity of the target pixel.

When the color signal calculation formulae, <Formulae 3> according to the first embodiment are used, the following values are obtained:

$$Gru=(2\times G33+G24+G42)/4=64$$

$$Rru=(R32+R34)/2+(2\times G33-G22-G44)/4=64$$

$$Bru=(B23+B43)/2+(2\times G33-G22-G44)/4=64$$

Thus, R=G=B is satisfied, and it is therefore possible to calculate color signals without moiré signals.

One of the characteristic configurations of the present invention is that: the correlations of the color signals at a vicinity point other than the vicinity pixels are used, with the use of the characteristic such as "the color components of a target pixel have correlations with the color components of a vicinity point".

According to the conventional method, a color signal at a center of a pixel is calculated, and the color signal of a target pixel is then calculated with the use of the pixel value and the calculated color signal based on the correlations with the color components of the target pixel.

According to the present invention, however, color components are calculated at an arbitrary point (a position) in the vicinity of a target pixel, and the color signal in then calculated based on the correlation with the color signals of the target pixel. Consequently, it is possible to obtain various color signal calculation formulae for each of different directions.

The following shows examples of a number of color signal calculation formulae:

The following formulae, <Formulae 6> and <Formulae 7> are color signal calculation formulae for an upper right direction in the case where the target pixel is a G component, and the reference is made to FIG. 12A:

$$Gru=(2\times G33+G42+G24)/4$$

$$Pru=Gru+(Pa-Ga+Pb-Gb)/2$$

$$Qru=Gru+(Qa-Ga+Qb-Gb)/2 \qquad \text{<Formulae 6>}$$

where
Ga=(G22+G33)/2
Pa=(3×P32+P14)/4
Qa=(3×Q23 Q41)/4
Gb=(G33+G44)/2
Pb=(3×P34+P52)/4
Qb=(3×Q43+Q25)/4

<Formulae 6> shown above are formulae for calculating color signals using the correlations related to the differences in the color signals, with respect to the position of the intersection A of V22, V32, V23, and V33 shown in FIG. 7, the position of the intersection B of V33, V43, V34, and V44, as well as the G component, the P component, and the Q component in the target pixel.

$$Gru=(2\times G33+G42+G24)/4$$

$$Pru=Gru+(Pe-Ga+Pb-Gb)/2$$

$$Qru=Gru+(Qa-Ga+Qb-Gb)/2 \qquad \text{<Formulae 7>}$$

where
Ga=(2×G24+G33+G15)/4
Pa=(P14+P34)/2
Qa=(Q23+Q25)/2
Gb=(2×G42+G33+G51)/4
Pb=(P32+P52)/2
Qb=(Q41+Q43)/2

<Formulae 7> shown above are formulas for calculating color signals using the correlations related to the differences in the color signals, with respect to the G components, the P components, and the components in V24, V42 shown in FIG. 7, and the target pixel.

The following formulae, <Formulae 8> and, <Formulae 9> are color signal calculation formulae for an upper right direction in the case where the target pixel is a P component, and the reference is made to FIG. 12B:

$$Pru=P33$$

$$Qru=(Q42+Q24)/2$$

$$Gru=P33+(Ga-Pa+Gb-Pb)/2 \qquad \text{<Formulae 8>}$$

where
Pa=(2×P33+P31+P13)/4
Ga=(G32+G23)/2
Pb=(2×P33+P35+P53)/4
Gb=(G34+G43)/2

<Formulae 8> shown above are formulae for calculating color signals using the correlations related to the differences in the color signals, with respect to the position of the intersection A of V22, V32, V23, and V33, the position of the intersection B of V33, V43, V34, and V44, as well as the G component and the P component in the target pixel.

$$Pru-P33$$

$$Qru=(Q42+Q24)/2$$

$$Gru=S33+(Ga-Sa+Gb-Sb)/2 \qquad \text{<Formulae 9>}$$

where
S33=(2×P33+Q42+Q24)/4
Sa=(2×P33+P31+P13+2×Q22+Q24+Q42)/8
Ga=(G41+3×G32+3×G23+G14)/8
Sb=(2×P33+P35+P53+2×Q44+Q24+Q42)/8
Gb=(G25+3×G34+3×G43+G52)/8

<Formulae 9> shown above are formulae for calculating color signals using the correlations related to the differences in the color signals, with respect to the position of the intersection A of V22, V32, V23, and V33, the position of the intersection B of V33, V43, V34, and V44, as well as the average of the G component, the P component, and the Q component in the target pixel.

It is also possible to come up with other various color signal calculation formulae besides <Formulae 3> and <Formulae 6> to <Formulae 9>.

Second Embodiment

In the second embodiment, explanation is provided for a case in which color-ratio correlations are used, unlike the first embodiment in which the processing (Step S3 in FIG. 3) performed by the direction color signal calculation section 63 uses color difference correlations. In other words, in the first embodiment, the color signals are calculated with the use of the correlations related to differences in the color signals, whereas in the second embodiment, color signals are calculated with the use of the correlations related to ratios in the color signals.

As shown in FIG. 1 and FIG. 2, an image processing apparatus 10A according to the second embodiment comprises: a solid state image pickup device 1 that in operable to pick up an image of an object an A/D conversion section 2 that performs an A/D conversion on image pickup data output from the solid state image pickup device 11 and an image processing section 3A that serves as an image processing apparatus operable to perform various types of signal processing on digital signals output from the A/D conversion section 2.

The image processing section 3A includes: a white balance section 4, a gamma correction section 5, and a data interpolation section 6A. The data interpolation section 6A includes: a direction data calculation section 61, a direction detection section 62, a direction color signal calculation section 63A, a target pixel color signal calculation section 64, and a control section 65 for controlling the respective sections.

The direction color signal calculation section 63A includes: a color ratio calculation section (not shown in the drawing) which is operable to calculate a ratio between color signals for two different colors at an arbitrary point in the vicinity of a target pixel while the direction is taken into account; and a color signal calculation section (not shown in the drawing) which is operable to calculate a color signal using a correlation of the ratio between the color signals calculated by the color ratio calculation section.

The following describes a color signal calculation method used by the direction color signal calculation section 63A (corresponding to Step S3 shown in FIG. 3) in the second embodiment. It should be noted that since the direction data calculation section 61 (Step S1 in FIG. 3) and the direction detection section 62 (Step 22 in FIG. 3) and the target pixel color signal calculation section 64 (Step S4 in FIG. 3) are configured to perform the same processing as in the first embodiment, explanation thereof will be omitted.

Here, the correlation related to a ratio between color signals refers to the characteristic such as "in a local area, the variation of the color signal is small, and the ratio between different color components is substantially regular." Specifically, Q' and G' which are the Q and G components of the vicinity pixels are calculated while the directions are taken into account, and then Q, which is the Q component of the target pixel, can be obtained with the use of <Formulae 10> shown below, based on the relation between Q and G, which are the Q and G components of the target pixel. The P component can be also obtained in the same manner.

$$Q = G \times (Q'/G')$$

$$P = G \times (P'/G') \qquad \text{<Formulae 10>}$$

There are many different methods for calculating a color signal for each direction; however, in the present example, like in the first embodiment, explanation is provided for color signal calculation formulae fox a vertical direction and an upper right direction. A color signal calculation formula for a horizontal direction can be obtained by rotating the color signal calculation formula for the vertical direction by 90 degrees. In the similar manner, the color signal calculation formula for a lower right direction can be obtained by rotating the color signal calculation formula for the upper right direction by 90 degrees.

<Formulae 11> shown below are examples of color signal calculation formulae that may be used by the direction color signal calculation section 63A.

<Formulae 11>

In the cage where the target pixel is G33 (See FIG. 12A):

$$Gve = G33$$

$$Pve = (P32 + P34)/2$$

$$Qve = G33 + (Q23/G23' + Q43/G43')/2$$

where
G23'=(G22+G24)/2
G43'=(G42+G44)/2
Gru=(2×G33+G42+G24)/2
Pru=Gru×(P32/G32'+P34/G34')/2
Qru=Gru×(Q23/G23'+Q43/G43')/2 where
G32'=(G22+G42)/2
G34'=(G24+G44)/2
G23'=(G22+G24)/2
G43'=(G42+G44)/2

In the cause where the target pixel is P33 (See FIG. 12B):

$$Gve = (G32 + G34)/2$$

$$Pve = P33$$

$$Qve = Gve \times (Q23'/G23 + Q43'/G43)/2$$

where
Q23'=(Q22+Q24)/2
Q43'=(Q42+Q44)/2
Pru=P33
Qru=(Q42+Q24)/2
Gru=S33+(Ga/Sa+Gb/Sb)/2 where
S33=(2×P33+Q42+Q24)/4
Sa=(P33+Q22)/2
Ga=(G32+G23)/2
Sb=(P33+Q44)/2
Gb=(G34+G43)/2

Gve denotes the G component color signal for a vertical direction.

Pve denotes the P component color signal for the vertical direction.

Qve denotes the Q component color signal for the vertical direction.

Gru denotes the G component color signal for the upper right direction.

Pru denotes the P component color signal for the upper right direction.

Qru denotes the Q component color signal for the upper right direction.

The following explains how <Formulae 11> above are obtained:

Firstly, explanation is provided on how to obtain a color signal for a vertical direction (in the case where the detected edge direction is a vertical direction) in the case where the target pixel is a G component. Secondly, explanation is provided on how to obtain a color signal for a vertical direction in the case where the target pixel is a P component. Thirdly, explanation is provided on how to obtain a color signal for an upper right direction (in the case where the detected edge direction is an upper right direction) in the case where the target pixel is a G component. Lastly, explanation is provided on how to obtain a color signal for an upper right direction in the case where the target pixel is a P component.

Firstly, the following explains how to obtain the color signal calculation formulae, <Formulae 11> for a vertical direction in the case where the target pixel V33 is a G component, with reference to FIG. 7 and FIG. 12A which show the positions of pixels.

In <Formulae 11> shown above, the G component, the R component, and the B component of the color signal for the vertical direction are expressed by Gve, Pve, and Qve respectively. It should be noted that Pve may be either the R component or the B component; and Qve may be either the B component or the R component.

As for Gve, which is a G signal for the target pixel V33, the value G33 is used.

As for Pve, which is a P signal for the target pixel V33, the average of the pixel components of the pixels positioned next to V33 in the vertical direction, namely V32 and V34, is used.

As for Qve, which is a Q signal for the target pixel V33, calculation is based on the correlation related to a ratio between color signals in the vertical direction.

Here, focus is given to the pixels V23, V43, and V33, and it is assumed that the ratio between the G component G23' and the Q component Q23 in the pixel V23, the ratio between the G component G43' and the Q component Q43 in the pixel V43, and the ratio between the G component G33 and the Q component Q33 in the pixel V33 are all substantially equal. The average of the ratio between the Q component and the G component in the pixel V23 and the ratio between the Q component and the G component in the pixel V43 is calculated by (Q'/G') shown in <Formulae 10> above, so that Q33, which is the Q component in the target pixel V33, is calculated.

The following explains how to obtain the color signal calculation formulae, <Formulae 11> for a vertical direction in the case where the target pixel V33 is a P component, with reference to FIG. 7 and FIG. 12B which show the positions of pixels.

As for Gve, which is a G component for the target pixel V33, the average of the pixel values of the pixels positioned next to V33 in the vertical direction, namely V32 and V34, is used.

As for Pve, which is a P component for the target pixel V33, the value P33 is used.

As for Qve, which in a Q component for the target pixel V33, calculation is based on the correlation related to a ratio between color signals in the vertical direction, just like in the case where the target pixel n a G component.

Here, focus is given to the pixels V23, V43, and V33, and it is assumed that the ratio between the G component G23 and the Q component Q23' in the pixel V23, the ratio between the G component G43 and the Q component Q43' in the pixel V43, and the ratio between the G component Gve and the Q component Q33 in the pixel V33 are all substantially equal. The average of the ratio between the Q component and the a component in the pixel V23 and the ratio between the Q component and the G component in the pixel V43 is calculated by (Q'/G') shown in <Formulae 10> above, so that Q33, which is the Q component in the target pixel V33, is calculated.

The following explains how to obtain the color signal calculation formulae, <Formulae 11> for an upper right direction in the case where the target pixel V33 is a G component, with reference to FIG. 7 and FIG. 12A which show the positions of pixels.

In <Formulae 11> shown above, the G component, the R component, and the B component of the color signal in the case where the detected edge direction is the upper right direction are expressed by Gru, Pru, and Qru respectively. It should be noted that Pru may be either the R component or the B component: and Qru may be either the B component or the R component.

Gru, which is the G component of the target pixel V33, is calculated from the pixels V33, V42, and V24.

As for Pru and Qru, which are the P component of the target pixel V33 and the Q component of the target pixel V33, calculation is based on the correlation related to a ratio between color signals in the upper right direction.

The following explains how to calculate the color signal using the color correlations, with regard to the P component of the target pixel V33.

Here, focus is given to the pixels V32, V34, and V33, and it is assumed that the ratio between the P component P32 and the G component G32' in the pixel V32, the ratio between the P component P34 and the G component G34' in the pixel V34, and the ratio between the P component P33 and the G component G33 in the pixel V33 are all substantially equal.

One of the characteristic configurations of the present invention lies in how to calculate the G component. G32' and G34'. According to the conventional method, in order to calculate the G component of the pixel V32, the pixels positioned in the upper right direction which includes the pixel V32 are used in the calculation. However, since only P and Q components exist in the upper right direction which includes the pixel V32, it is not possible to calculate a G component.

In contrast, according to the present invention, the characteristic lies in that, in order to calculate G32', which is the G component of the pixel V32, pixels other than the pixels positioned in the upper right direction are referenced.

For example, as the value of G32', which is the a component in the pixel V32, the average of G22 and G42 is used. In the same manner, as the value of G34', which is the G component in the pixel V34, the average of G24 and G44 is used.

Like the color correlations in the vertical direction, with the use of the G components calculated in this manner, the average of the ratio between the P component and the G component in the pixel V32 and the ratio between the P component and the G component in the pixel V34 is calculated by (P'/G') shown in <Formulas 10> above, so that P33, which is the P component in the target pixel V33 is calculated.

The following explains how to calculate the color signal using the color correlations, with regard to the Q component of the target pixel V33. Basically, the color signal for the Q component is calculated in the same manner as that for the P component is calculated.

Here, focus is given to the pixels V23, V43, and V33, and it is assumed that the ratio between the Q component Q23 and the G component G23' in the pixel V23, the ratio between the Q component Q43 and the G component Q43' in the pixel V43, and the ratio between the Q component Q33 and the G component G33 in the pixel Y33 are all substantially equal.

For example, the average of the ratio between the Q component and the G component in the pixel V23 and the ratio between the Q component and the G component in the pixel V43 is calculated by (Q'/G') shown in <Formulae 10> above, 80 that Q33, which is the Q component in the target pixel V33 is calculated.

Lastly, the following explains how to obtain the color signal calculation formulae, <Formulae 11> for an upper right direction in the case where the target pixel V33 is a P component with reference to FIG. 7 and FIG. 12B which show the positions of pixels.

As for Pru, which is the P component of the target pixel V33, the value P33 is used.

As for Qru, which is the Q component of the target pixel V33, the average of the pixel values of the pixels positioned adjacent to V33 in the upper right direction, namely V42 and V24, is used.

As for Gru, which is the G component of the target pixel V33, calculation is based on the correlation related to a ratio between color signals in the upper right direction.

In FIG. 7, the intersection point (a position) of the four pixels, namely the pixel V22, the pixel V32, the pixel V23, and the pixel V33, is referred to as Point A. The intersection point (a position) of the four pixels, namely the pixel V33, the pixel V43, the pixel V34, and the pixel V44, is referred to as Point B.

Here, focus is given to Point A and Point B in addition to the pixel V33. It is assumed that the ratio between the average S33 of the P and Q components and the G component G33 in the pixel V33, the ratio between the average Sa of the P and Q components and the G component Ga at Point A, and the ratio between the average Sb of the P and Q components and the G component Gb at Point B are all substantially equal.

Here, based on the correlation related to the ratio between color signals in a local area, <Formulae 12> below are obtained, in the same manner as <Formulae 10> above.

$$G = S \times (G'/S') \qquad \text{<Formulae 12>}$$

where

G denotes the G component of the target pixel,

S denotes the average of the P component and the Q component of the target pixel, G' denotes the G component at a point in the vicinity of the target pixel, S' denotes the average of the P component and the 0 component at the point in the vicinity of the target pixel, and the point in the vicinity of the target pixel in G' is identical to that in S'.

Accordingly, the average of the ratio between the value S and the G component at Point A and the ratio between the value S and the G component at Point B is calculated by (G'/S') shown in <Formulae 12> above, so that G33, which is the a component in the target pixel V33, is calculated.

As described above, according to the second embodiment, it is possible to perform an interpolation processing with the use of correlations of color signals with respect to edges in diagonal directions, as well as with the use of the characteristics in local areas of images. Since it is possible to calculate color signals with the use of color correlations in diagonal directions, it is possible to calculate the color signals by detecting directions of the images more precisely than the conventional interpolation processing method in which color correlations in the vertical and horizontal directions are used.

For example, in a Bayer array having the luminance values shown in FIG. 13A, in the case where focus is given to the target pixel G33 and the direction data calculation formulae, <Formulae 2> according to the second embodiment are used, the following values are obtained:

DDru=248

DDho=744

DDrd=744

DDve=434

In this case, the direction detection section 62 detects a direction corresponding to the direction data having the minimum value (i.e. DDru; an upper right direction) as an edge direction in the vicinity of the target pixel.

When the color signal calculation formulae, <Formulae 11> according to the second embodiment are used, the following values are obtained:

$$Gru = (2 \times G33 + G24 + G42)/2 = 128$$

$$Rru = Gru \times [\{(R32/(G22 + G42)/2\} + \{(R34/(G24 + G44)/2\}]$$
$$= 128$$

$$Bru = Gru \times [\{(B23/(G22 + G24)/2\} + \{(B43/(G42 + G44)/2\}]$$
$$= 128$$

Thus, R=G=B is satisfied, and it is therefore possible to calculate color signals without moiré signals.

Third Embodiment

In the third embodiment, it is described a case where eight direction data are calculated for eight directions around the target pixel. The eight directions are: an upper direction, an upper right direction, a right direction, a lower right direction, a lower-direction, a lower left direction, a left direction and an upper left direction. In this case, at least one direction corresponding to at least one direction data having the minimum value or a value closer to the minimum value is detected as candidates for an edge direction within the vicinity of the target pixel.

As shown in FIGS. 1 and 2, the image processing apparatus 10B according to the third embodiment comprises: a solid state image pickup device 1 that is operable to pick up an image of an object; an A/D conversion section 2 that performs an A/D conversion on image pickup data output from the solid state image pickup device 1; and an image processing section 33 that serves as an image processing apparatus operable to perform various types of signal processing on digital signals output from the A/D conversion section 2.

The image processing section 3B includes: a white balance section 4, a gamma correction section 5, and a data interpolation section 6B. The data interpolation section 6B includes: a direction data calculation section 61B, a direction detection section 62B, a direction color signal calculation section 63B, a target pixel color signal calculation section 64, and a control section 65 for controlling the respective sections.

The target pixel color signal calculation section 64B includes: an average color calculation section (not shown in the drawing) which serves as an average color calculation means and is operable to calculate an average color of color signals corresponding to the plurality of directions detected by the direction detection section 62B; and a multiple color correlation color signal calculation section (not shown in the drawing) which serves as a multiple color correlation color signal calculation means and is operable to calculate a color signal using a correlation between the color calculated by the average color calculation section (not shown in the drawing) and the color of the target pixel.

FIG. 3 also serves as a flowchart for explaining an example of the operation performed by the data interpolation section 6B according to the third embodiment.

The following describes the processing procedure of the data interpolation processing performed by the data interpolation section 6B of the third embodiment, sequentially according to the steps of the processing. It should be noted that the processing in Steps S1 through S4 is repeated, as shown in FIGS. 3 and 4, as many times as the number of the pixels in an interpolation specified area within an inputted Bayer data area.

As shown in FIG. 3, in Step 81, the direction data calculation section 61B calculates a plurality of direction data of the target pixel for the plurality of predetermined edge directions (i.e. specified directions).

Figure 8:
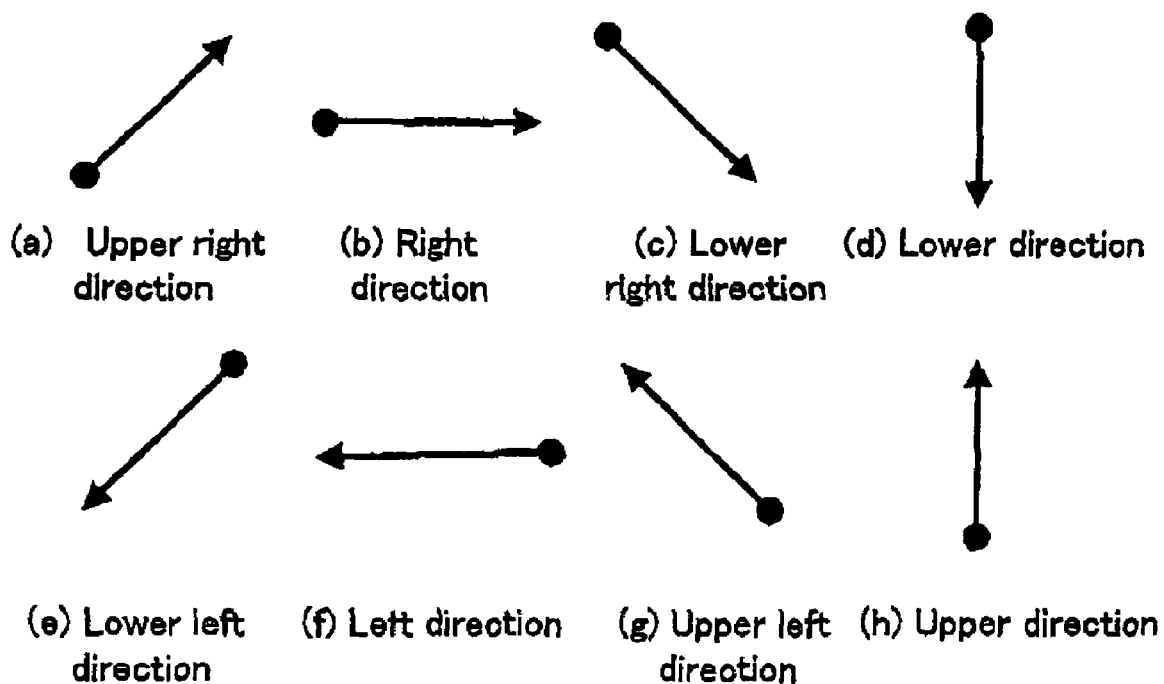
FIG. 8 is a schematic drawing showing eight predetermined directions used in the third embodiment of the present invention.

As shown in FIG. 8, the direction data calculation section 61B uses, as the plurality of edge directions, eight directions around the target pixel, namely, an upper right direction, a right direction, a lower right direction, a lower direction, a lower left direction, a left direction, an upper left direction, and an upper direction. The characteristic of the third embodiment lies in that it is possible to calculate a plurality of edge data in which terminal points of edges are taken into account by calculating a plurality of direction data for eight directions around the target pixel.

For example, the direction data calculation section 61B calculates the plurality of direction data, such that each of the plurality of direction data has a value which is smaller as the similarity between one of the plurality of predetermined edge directions and an actual edge direction within the vicinity of the target pixel is larger. There may be various types of formulae for calculating the plurality of direction data. For example, the following formulae <Formulae 13> can be used to calculate the plurality of direction data:

<Formulae 13>

In the case where the target pixel is G33 (See FIG. 12A):

$DDru = (|G51 - G33| + |G42 - G33| + |P52 - P34| + |Q41 - Q23|)$ $DDri = (|G53 - G33| + |Q23 - Q43|) +$
$\quad (|G22 - G42| + |G24 - G44| + |P52 - P32| + |P54 - P34|)/2$ $DDrd = (|G44 - G33| + |G55 - G33| + |P32 - P54| + |Q23 - Q45|)$ $DDdo = (|G35 - G33| + |P32 - P34|) +$
$\quad (|G22 - G24| + |G42 - G44| + |Q25 - Q23| + |Q45 - Q43|)/2$ $DDld = (|G15 - G33| + |G24 - G33| + |P25 - P43| + |Q14 - Q32|)$ $DDle = (|G13 - G33| + |Q23 - Q43|) +$
$\quad (|G22 - G42| + |G24 - G44| + |P12 - P32| + |P14 - P34|)/2$ $DDlu = (|G22 - G33| + |G11 - G33| + |P12 - P34| + |Q21 - Q43|)$ $DDup = (|G31 - G33| + |P32 - P34|) +$
$\quad (|G22 - G24| + |G42 - G44| + |Q21 - Q23| + |Q41 - Q43|)/2$ In the case where the target pixel is P33 (See FIG. 12B):

$DDru = (|P51 - P33| + |Q42 - Q24|) +$
$\quad (|G32 - G23| + |G41 - G32| + |G52 - G43| + |G43 - G34|)/2$ $DDri = (|P53 - P33| + |G23 - G43|) +$
$\quad (|Q22 - Q42| + |G32 - G52| + |Q24 - Q44| + |G34 - G54|)/2$ $DDrd = (|P55 - P33| + |Q44 - Q22|) +$
$\quad (|G32 - G43| + |G43 - G54| + |G23 - G34| + |G34 - G45|)/2$ $DDdo = (|P35 - P33| + |G32 - G34|) +$
$\quad (|Q22 - Q24| + |G23 - G25| + |Q42 - Q44| + |G43 - G45|)/2$ $DDld = (|P15 - P33| + |Q42 - Q24|) +$
$\quad (|G32 - G23| + |G43 - G34| + |G23 - G14| + |G34 - G25|)/2$ $DDle = (|P13 - P33| + |G23 - G43|) +$
$\quad (|Q22 - Q42| + |Q24 - Q44| + |G12 - G32| + |G14 - G34|)/2$ $DDlu = (|P11 - P33| + |Q22 - Q44|) +$
$\quad (|G21 - G32| + |G32 - G43| + |Q12 - Q23| + |G23 - G34|)/2$ $DDup = (|P31 - P33| + |G32 - G34|) +$
$\quad (|Q22 - Q24| + |Q42 - Q44| + |G21 - G23| + |G41 - G43|)/2$ DDru denotes the formula for calculating direction data for the upper right direction, DDri denotes the formula for calculating direction data for the right direction.

DDrd denotes the formula for calculating direction data for the lower right direction.

DDdo denotes the formula for calculating direction data for the lower direction.

DDld denotes the formula for calculating direction data for the lower left direction.

DDle denotes the formula for calculating direction data for the left direction.

DDlu denotes the formula for calculating direction data for the upper left direction.

DDup denotes the formula for calculating direction data for the upper direction.

In Step S2, the direction detection section 62B detects whether or not an edge of the target pixel exists and, if any, the directions of the edge, by the use of the plurality of direction data calculated in Step S1.

Figure 9:
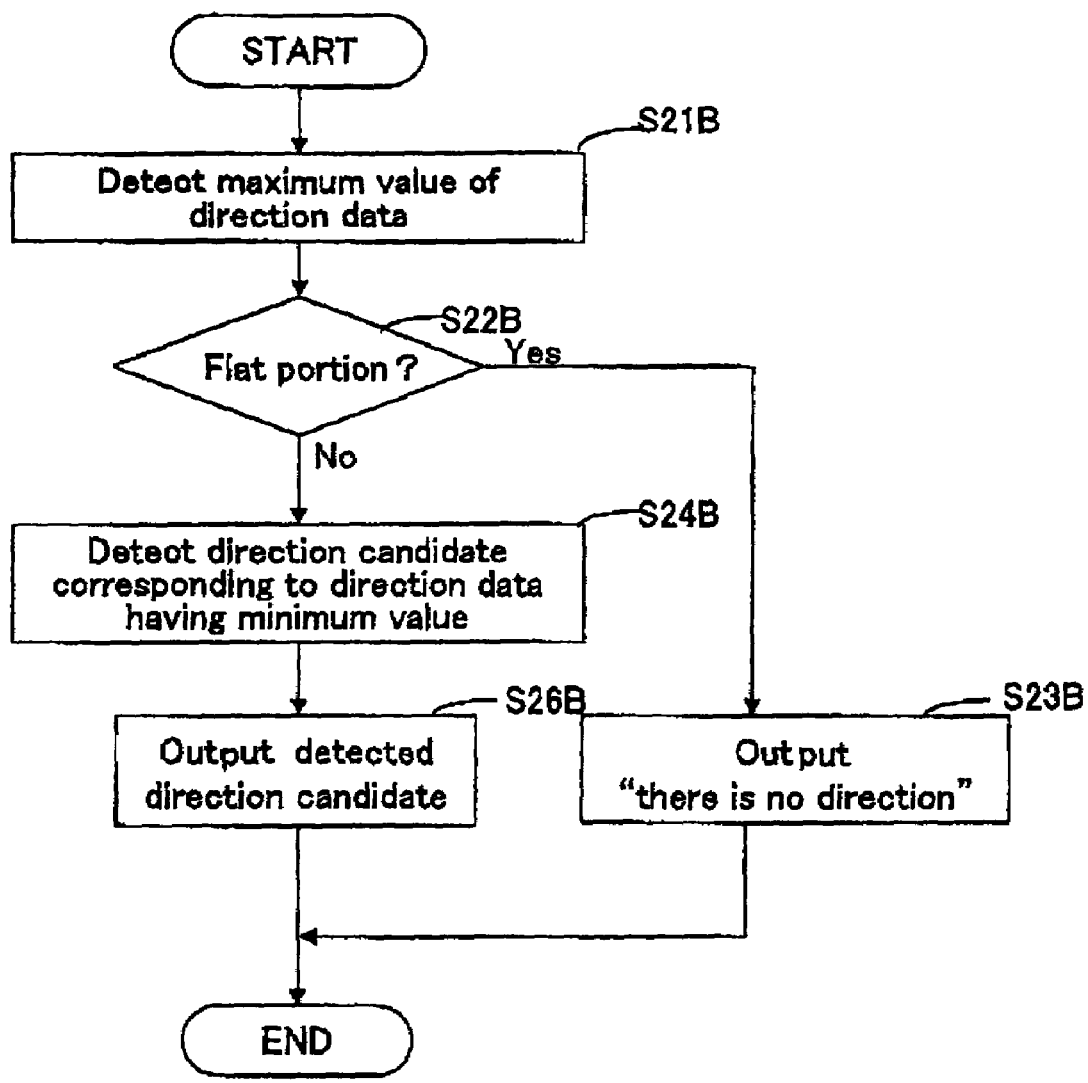
FIG. 9 is a flowchart for explaining another example (the third embodiment) of direction detection processing operation performed by the direction detection section shown in FIG. 2.

FIG. 9 is a flowchart for explaining examples of operations performed by the direction detecting section 62B (other examples of Step S2) according to the third embodiment.

The following describes the processing procedure of the direction detection processing performed by the direction detection section 62B, sequentially according to the steps of the processing.

As shown in FIG. 9, in step S21B, the maximum value of the eight direction data calculated in Step S1 is detected.

In Step S22B, it is determined whether or not the maximum value of the plurality of direction data detected in Step S21B is smaller then a threshold value B, which is stored in a register (not shown).

Thus, it is determined whether or not a gradient of luminance is so flat that no edge exists within the vicinity of the target pixel. In the case where the gradient of luminance is flat ("YES" in Step S228), a signal indicating that "there is no direction" is output in Step S23B, and the direction detection processing of the target pixel in completed. On the other hand, in the case where the gradient of luminance is not flat ("NO" in Step S22B), the procedure proceeds to Step S24B.

It should be noted that the range of the threshold value B varies depending on the formulae for calculating the plurality of direction data. In general, the larger the threshold value B is, the more pixels are determined to be in a flat portion, whereas the smaller the threshold value B is, the fewer pixels are determined to be in a flat portion.

In Step S24B, at least one direction corresponding to at least one direction data having the minimum value or a value closer to the minimum value from among the eight direction data-calculated in Step S1 is detected. Each of the at least one direction detected in this stop is referred to as a direction candidate.

For example, in the case where the following determination formula <Formula 14> is satisfied, a direction corresponds to the direction data is detected.

$$DD\text{min} \geq \text{threshold value } C \times DDi \qquad \text{<Formula 14>}$$

where

DDi denotes the direction data of the target pixel.

DDmin denotes the minimum value of the plurality of direction data,

The range in which the threshold value C may vary is expressed as: $0 \leq$ threshold value $C \leq 1$. The larger the threshold value C is, the smaller number of directions are detected, whereas the smaller the threshold value C is, the larger number of directions are detected.

Finally, in step S26B, the at least one direction detected in Step S24B is output, and thus the direction detection processing of the target pixel is completed.

In Step S3 shown in FIG. 3, the direction color signal calculation section 63B calculates color signals for the directions detected by the direction detection section 62B.

In the third embodiment, it is possible to calculate color signals for the eight directions including diagonal directions, with the use of the color signal calculation formulae in which color correlations are used. In addition, in the third embodiment, as for the color signals corresponding to the eight directions, the color signals of the eight vicinity pixels that are positioned adjacent to the target pixel are calculated, but not the color signals of the target pixel itself.

For example, as for the direction color signal for the upper right direction of the target pixel V33 in FIG. 7, the color signal of V42 is calculated.

As another example, as for the direction color signal for the lower direction of the target pixel V33 in FIG. 7, the color signal of V34 is calculated.

In order to calculate the direction color signals, the color signal calculation formulae which utilize the correlations related to the differences in the color signals as described in the first embodiment or the color signal calculation formulae which utilize the correlations related to the ratios of the color signals as described in the second embodiment are used for the calculation of the color signals for the direction candidates.

<Formulae 15> and <Formulae 16> shown below are examples of direction color signal calculation formulae for the eight directions. It should be noted that <Formulae 15> are direction color signal calculation formulae in the case where the target pixel is G33 (See FIG. 12A) whereas <Formula 16> are direction color signal calculation formulae in the case where the target pixel is P33 (See FIG. 12B).

$$Gru = (G33 + 2 \times G42 + G51)/4 \qquad \text{< Formulae 15 >}$$

$$Pru = (P32 + P52)/2 + (2 \times G42 - G31 - G53)/4$$

$$Qru = (Q41 + Q43)/2 + (2 \times G42 - G31 - G53)/4$$

$$Gri = (G53 + G33)/2$$

$$Pri = (P32 + P52 + P34 + P54)/4 +$$

$$(G33 + G53 - G42 - G44)/2$$

-continued $$Qri = Q43$$

$$Grd = (G33 + 2 \times G44 + G55)/4$$

$$Prd = (P34 + P54)/2 + (2 \times G44 - G35 - G53)/4$$

$$Qrd = (Q43 + Q45)/2 + (2 \times G44 - G35 - G53)/4$$

$$Gdo = (G33 + G35)/2$$

$$Pdo = P34$$

$$Qdo = (Q23 + Q25 + Q43 + Q45)/4 +$$

$$(G33 + G35 - G24 - G44)/2$$

$$Gld = (G33 + 2 \times G24 + G15)/4$$

$$Pld = (P14 + P34)/2 + (2 \times G24 - G33 - G15)/4$$

$$Qld = (Q23 + Q25)/2 + (2 \times G24 - G33 - G15)/4$$

$$Gle = (G33 + G13)/2$$

$$Ple = (P12 + P32 + P14 + P34)/4 +$$

$$(G33 + G13 - G22 - G24)/2$$

$$Qle = Q23$$

$$Glu = (G33 + 2 \times G22 + G11)/4$$

$$Plu = (P12 + P32)/2 + (2 \times G22 - G31 - G13)/4$$

$$Qlu = (Q21 + Q23)/2 + (2 \times G22 - G31 - G13)/4$$

$$Gup = (G33 + G31)/2$$

$$Pup = P32$$

$$Qup = (Q21 + Q23 + Q41 + Q43)/4 +$$

$$(G33 + G31 - G22 - G42)/2$$

Gru denotes the G component for the upper right direction.
Pru denotes the P component for the upper right direction.
Qru denotes the Q component for the upper right direction.
Gri denotes the G component for the right direction.
Pri denotes the P component for the right direction.
Qri denotes the Q component for the right direction.
Grd denotes the G component for the lower right direction.
Prd denotes the P component for the lower right direction.
Qrd denotes the c component for the lower right direction.
Gdo denotes the G component for the lower direction.
Pdo denotes the P component for the lower direction.
Qdo denotes the Q component for the lower direction.
Gld denotes the G component for the lower left direction.
Pld denotes the P component for the lower left direction.
Qld denotes the Q component for the lower left direction.
Gle denotes the G component for the left direction.
Ple denotes the P component for the left direction.
Qle denotes the Q component for the left direction.
Glu denotes the G component for the upper left direction.
Plu denotes the P component for the upper left direction.
Qlu denotes the Q component for the upper left direction,
Gup denotes the G component for the upper direction.
Pup denotes the P component for the upper direction.
Qup denotes the Q component for the upper direction.

$$Gru = (G41 + G32 + G52 + G43)/4 + \qquad \text{< Formulae 16 >}$$

$$(P33 + P51 - P31 - P53)/4$$

-continued $$Pru = (P33 + P51)/2$$

$$Qru = Q42$$

$$Gri = G43$$

$$Pri = (P33 + P53)/2$$

$$Qri = (Q42 + Q44)/2 +$$
$$(4 \times G43 - G32 - G52 - G34 - G54)/4$$

$$Grd = (G45 + G34 + G54 + G43)/4 +$$
$$(P33 + P55 - P35 - P53)/4$$

$$Prd = (P33 + P55)/2$$

$$Qrd = Q44$$

$$Gdo = G34$$

$$Pdo = (P33 + P35)/2$$

$$Qdo = (Q24 + Q44)/2 +$$
$$(4 \times G34 - G23 - G25 - G43 - G45)/4$$

$$Gld = (G25 + G23 + G14 + G34)/4 +$$
$$(P33 + P15 - P13 - P35)/4$$

$$Pld = (P33 + P15)/2$$

$$Qld = Q24$$

$$Gle = G23$$

$$Ple = (P13 + P33)/2$$

$$Qle = (Q22 + Q24)/2 +$$
$$(4 \times G23 - G12 - G32 - G14 - G34)/4$$

$$Glu = (G21 + G12 + G32 + G23)/4 +$$
$$(P33 + P11 - P31 - P13)/4$$

$$Plu = (P33 + P11)/2$$

$$Qlu = Q22$$

$$Gup = G32$$

$$Pup = (P33 + P31)/2$$

$$Qup = (Q22 + Q42)/2 +$$
$$(4 \times G32 - G21 - G23 - G41 - G43)/4$$

In Step S4 shown in FIG. 3, the target pixel color signal calculation section 64B calculates, as color signals of the target pixel, the averages of the color signals (rr, gg, bb) based on the direction color signals calculated by the direction color signal calculation section 63B (in Step S3) in correspondence with the direction candidates detected by the direction detection section 62B (in Step S2).

By the processing in Step S5, the processing in Steps S1 to S4 is repeated until the interpolation processing is completed for all of the pixels.

According to the third embodiment, since the directions are detected for the eight directions around the target pixel, it is possible to perform an interpolation processing with fewer moiré signals, while the terminal points of edges are taken into account.

In addition, there is another method of calculating color signals of a target pixel with the use of color signal correlations between the average colors (rr, gg, bb) of the direction color signals corresponding to the direction candidates calculated as above and the color components of the target pixel.

For example, in the case where the color component of the target pixel is a G component g, the color components Go, Ro, and Bo of the color signals of the target pixel can be calculated using <Formulae 17> shown below:

$$Go = g$$

$$Ro = g + rr - gg$$

$$Bo = g + bb - gg \qquad \text{<Formulae 17>}$$

According to the method using <Formulae 17> shown above, in order to calculate direction color signals for the directions, color signals are calculated with the use of the correlations in the color signals so that the correlations between the average color of the color signals and the color of the color components of the target pixel can be utilized. Consequently, it is possible to restrain the occurrence of moiré signals by calculating some color signals with repeated implementation of color signal correlations on other color signals that are calculated using the color signal correlations thereof.

Fourth Embodiment

In the fourth embodiment, explanation is provided for a case where the processing performed by the direction data calculation section 61C shown in FIG. 2 (Step S1 in FIG. 3) is different from the ones in the first through third embodiments and where the strengths of the correlations of the color signals are taken into account when the directions of edges with respect to a plurality of directions in the vicinity of the target pixel are quantified.

As shown in FIGS. 1 and 2, the image processing apparatus 10C according to the fourth embodiment comprises: a solid state image pickup device 1 that is operable to pick up an image of an object; an A/D conversion section 2 that performs an A/D conversion on image pickup data output from the solid state-image pickup device 1; and an image processing section 3C that serves as an image processing apparatus operable to perform various types of signal processing on digital signals output from the A/D conversion section 2.

The image processing section 3C includes: a white balance section 4, a gamma correction section 5, and a data interpolation section 6C. The data interpolation section 6C includes: a direction data calculation section 61C, a direction detection section 62, a direction color signal calculation section 63, a target pixel color signal calculation section 64, and a control section 65 for controlling the respective sections.

The following describes a direction data calculation method used by the direction date calculation section 61C (another example of Step S1 In FIG. 3) of the fourth embodiment. It should be noted that since the direction detection section 62 (Step P2 in FIG. 3), the direction color signal calculation section 63 (Step S3 in FIG. 3) and the target pixel color signal calculation section 64 (Step S4 in FIG. 3) are able to perform the same processing as described in the first through third embodiments, explanation thereof will be omitted in this section.

In the first through third embodiments, for example, a plurality of direction data are calculated, such that each of the plurality of direction data has a value which is smaller as the similarity between one of the plurality of directions and an actual edge direction within the vicinity of the target pixel is larger. In contrast, in the fourth embodiment, a term is added to each direction data calculation formula in order to express the strength of the correlation of the color signals. For example, the term added to each direction data calculation formula has a smaller value when there is a correlation between the color signals in the edge portion and has a larger value when there is no correlation between the color signals Specifically, the direction data calculation section 61C quantifies the directions of the edge in the vicinity of the target pixel which includes the target pixel, in view of the strength of the correlation of the color signals which largely varies depending on the presence/absence of the edge.

At two points, namely a and b, in the vicinity of a target pixel, in the case where there is a correlation between the G component and the P component of the color signal, $$Ga - Pa = Gb - Pb$$

is satisfied. Consequently, the closer to "0" the value of |Ga−Gb+Pb−Pa| is, the stronger the correlation of the colors is between the two points a and b.

For example, terms expressing correlation strength may be added to the direction date calculation formulae <Formulae 2> used in the first and second embodiments, as shown in <Formulae 18> below:

<Formulae 18>

In the case where the target pixel is G33 (Sea FIG. 12A):

$$DDru' = DDru + (|(G22 + G42 - G24 - G44)/2 + (P34 - P32)| + |(G42 + G44 - G22 - G24)/2 + (Q23 - Q43)|)/2$$

$$DDho' = DDho + |(G22 + G42 - G24 - G44)/2 + (P34 - P32)|$$

$$DDrd' = DDrd + (|(G22 + G42 - G24 - G44)/2 + (P34 - P32)| + |(G42 + G44 - G22 - G24)/2 + (Q23 - Q43)|)/2$$

$$DDve' = DDve + |(G42 + G44 - G22 - G24)/2 + (Q23 - Q43)|$$

In the case where the target pixel is P33 (See FIG. 12B):

$$DDru' = DDru + |(G32 + G23 - G43 - G34)/2 + (Q44 - Q22)|$$

$$DDho' = DDho + |(G32 - G34) + (Q24 + Q44 - Q22 - Q42)/2|$$

$$DDrd' = DDrd + |(G32 + G23 - G43 - G34)/2 + (Q24 - Q22)|$$

$$DDve' = DDve + |(G23 - G43) + (Q42 + Q44 - Q22 - Q24)/2|$$

DDru' denotes the formula for calculating direction data for the upper right direction.

DDho' denotes the formula for calculating direction data for the horizontal direction.

DDrd' denotes the formula for calculating direction data for the lower right direction.

DDve' denotes the formula for calculating direction data for the vertical direction.

Alternatively, terms expressing correlation strength may be added to the direction data calculation formulae <Formulas 13> used in the third embodiment, as shown in <Formulae 19> below:

<Formulae 19>

In the case where that target pixel is G33 (See FIG. 12A):

$$DDru' = DDru + (|G31 + G51 - G33 - G53)/2 + (Q43 - Q41)| + |(G31 + G33 - G51 - G53)/2 + (P52 - P32)|)/2$$

$$DDri' = DDri + (|P32 + P52 - P34 - P54)/2 + (G44 - G42)|)$$

$$DDrd' = DDrd + (|(G33 + G35 - G53 - G55)/2 + (P54 - P34)| + |(G33 + G53 - G35 - G55)/2 + (Q45 - Q43)|)/2$$

$$DDdo' = DDdo + (|(Q23 + Q25 - Q43 - Q45)/2 + (G44 - G24)|)$$

$$DDld' = DDld + (|G13 + G33 - G15 - G35)/2 + (Q25 - Q23)| + |(G13 + G15 - G33 - G35)/2 + (P34 - P14)|)/2$$

$$DDle' = DDle + (|(P12 + P32 - P14 - P34)/2 + (G24 - G22)|)$$

$$DDlu' = DDlu + (|(G11 + G31 - G13 - G33)/2 + (Q23 - Q21)| + |(G11 + G13 - G31 - G33)/2 + (P32 - P12)|)/2$$

$$DDup' = DDup + (|(Q21 + Q23 - Q41 - Q43)/2 + (G42 - G22)|)$$

In the case where the target pixel is P33 (See FIG. 12B):

$$DDru' = DDru + (|(G41 + G32 - G52 - G43) + (P53 - P31)|)$$

$$DDri' = DDri + (|(G32 + G52 - G34 - G54)/2 + (Q44 - Q42)|)$$

$$DDrd' = DDrd + (|(G43 + G54 - G34 - G45) + (P35 - P53)|)$$

$$DDdo' = DDdo + (|(G23 + G25 - G43 - G45)/2 + (Q44 - Q24)|)$$

$$DDld' = DDld + (|(G23 + G14 - G34 - G25) + (P35 - P13)|)$$

$$DDle' = DDle + (|(G12 + G32 - G14 - G34)/2 + (Q24 - Q22)|)$$

$$DDlu' = DDlu + (|(G21 + G32 - G12 - G23) + (P13 - P31)|)$$

$$DDup' = DDup + (|(G21 + G23 - G41 - G43)/2 + (Q42 - Q22)|)$$

DDru' denotes the formula for calculating direction data for the upper right direction.

DDri' denotes the formula for calculating direction data for the right direction.

DDrd' denotes the formula for calculating direction data for the lower right direction.

DDdo' denotes the formula for calculating direction data for the lower direction.

DDld' denotes the formula for calculating direction data for the lower left direction.

DDle' denotes the formula for calculating direction data for the left direction.

DDlu' denotes the formula for calculating direction data for the upper left direction.

DDup' denotes the formula for calculating direction data for the upper direction.

The direction data calculation section 61C shown in FIG. 2 calculates a plurality of direction data using <Formulae 18> as direction data calculation formulae, instead of <Formulae 2> above, and as described in the first and second embodiments, the processing by the direction detection section 62, the direction color signal calculation section 63, and the target pixel color signal calculation section 64 is performed using the calculated plurality of direction data.

Alternatively, the direction data calculation section 61C shown in FIG. 2 calculates the plurality of direction data using <Formulae 19> as direction data calculation formulae, instead of <Formulae 3> above, and as described in the third embodiment, the processing by the direction detection section 62, the direction color signal calculation section 63, and the target pixel color signal calculation section 64 is performed using the calculated plurality of direction data.

As described above, in the fourth embodiment, color signal calculation is performed while the correlations of the color signals are taken into account, with the use of the characteristic of color signals in a local area of an image in general. Generally peaking, however, there is not always correlation of color signals in an entire image. The fourth embodiment is suitable particularly for a case where an interpolation processing is performed with the use of correlations of the color signals on a part of an image where correlations of color signals are strong in an edge portion of the image.

Fifth Embodiment

In the fifth embodiment, explanation is provided for a case in which one of the processings in the first through fourth embodiments is performed using a data processing apparatus comprising a main body of a personal computer (hereafter, simply referred to as a PC) an input output apparatus, and a computer-readable recording medium (or a storage medium) recording thereon an image processing program of the present invention, parameter files having various types of data such as threshold values, and Bayer data.

Figure 10:
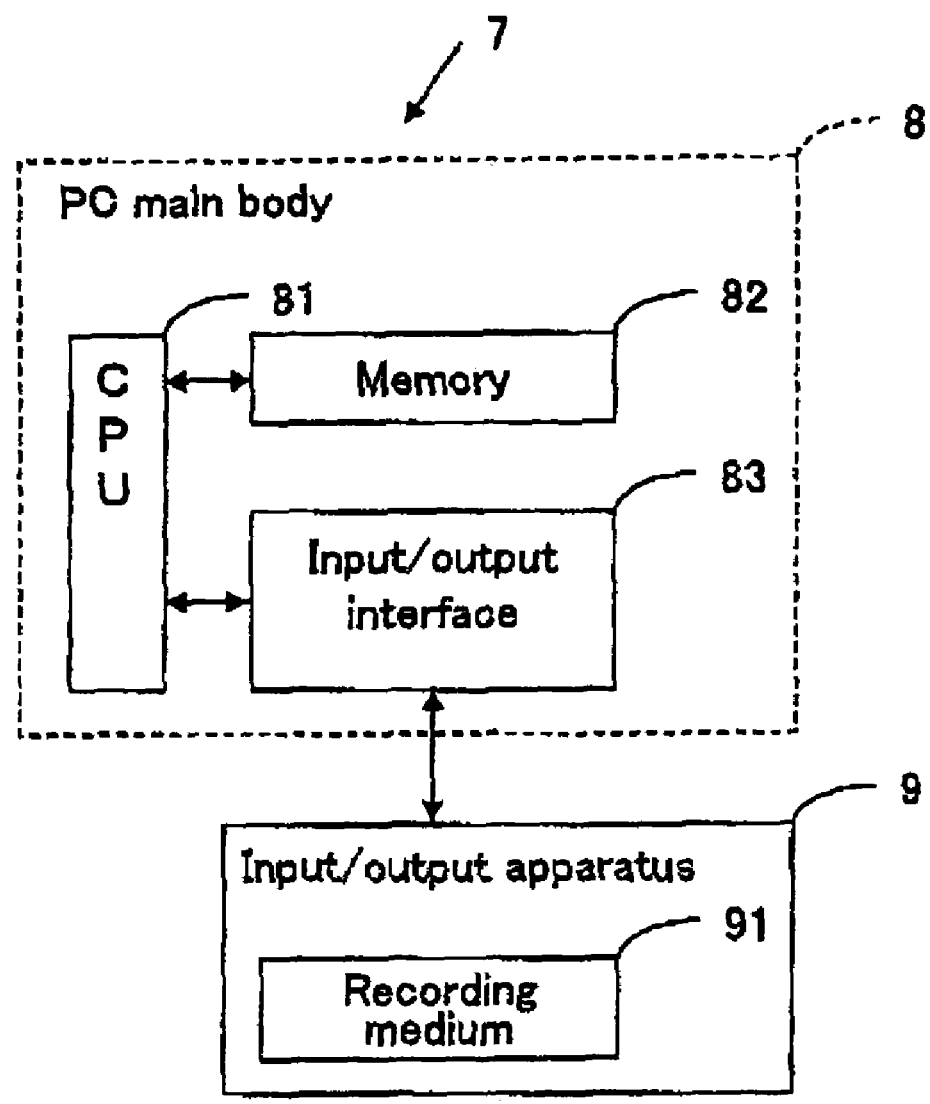
FIG. 10 is a block diagram showing an exemplary configuration of the data processing apparatus according to the fifth embodiment of the present invention.

FIG. 10 is a block diagram that shows a configuration example of the data processing apparatus of the fifth embodiment.

As shown in FIG. 10, the data processing apparatus 7 of the fifth embodiment comprises a PC main body 8, and an input output apparatus 9.

A CPU 81 that serves as a control section for controlling different elements, a memory 82 such as a hard disk, and an input output-interface 83 are built in the PC main body 8. A readable recording medium 91 such an an optical disc is built in the input output apparatus 9. It should be noted that the memory 82 is also a computer-readable recording medium on which the image processing program is recorded, The CPU 81 controls the input output apparatus 9 via the input output interface 83. The image processing program, the parameter file, and the Bayer data are read from the readable recording medium 91 inside the input output apparatus 9 and inputted via the input output interface 83 so as to be stored in the memory 82.

Further, the CPU 81 reads the image processing program, the parameter file, and the Bayer data from the memory 82 inside the PC main body 8. After an image processing including the interpolation processing according to one of the first through fourth embodiment is performed on the inputted Bayer data according to instructions of the image processing program, the input output apparatus 9 in controlled via the input output interface 83 of the PC main body 8 so that a plurality of image data after the image processing are output to the readable recording medium 91 via the input output interface 83.

Consequently, according to the fifth embodiment, it is possible to perform an image processing including the interpolation processing according to one of the first through fourth embodiments on a PC.

Specifically, although it is not shown in the drawings, since only Bayer data is output from an image pickup apparatus so that an image processing is performed by one of the image processing sections 3, 3A, 3B, and 3C on the PC main body 8 side, it is possible for the image pickup apparatus to perform a high-speed imaging. Further, since it is possible to perform image processing more than once with different threshold values on the PC main body 8 side, it is possible to easily obtain images with high quality as desired.

As described above, according to the first though fourth embodiments, the data interpolation section includes: a direction data calculation section for calculating a plurality of direction data by quantifying the directions of an edge with respect to & plurality of directions including, at least one of the upper right direction and the lower right direction in the vicinity of a target pixel; a direction detection section for detecting at least one direction of the edge in the vicinity of the target-pixel by using the plurality of direction data calculated by the direction data calculation section; a direction color signal calculation section for calculating at least one color signal corresponding to the at least one direction detected by the direction detection section; and a target pixel color signal calculation section for calculating a color signal for the target pixel by using the at least one color signal calculated by the direction color signal calculation section. With this arrangement, it is possible to further restrain the occurrence of moiré signals by the use of the correlations of the color signals with respect to the edge in the plurality of directions including a diagonal direction.

As described above, the present invention in exemplified by the use of the preferred first to fifth embodiments of the present invention. However, the present invention should not be interpreted solely based on these embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

In the fields of an image processing apparatus that generates all color signals for each pixel from color signals output from a solid state image pickup device in which color filters of a plurality of types are separately arranged in each pixel section, through an interpolation processing using color signals of a target pixel and the pixels in the vicinity thereof, as well as an imaging apparatus such as a single-chip digital camera, a video camera, or a mobile phone with a camera, in which such an image processing apparatus is used, an image processing method in which such an image processing apparatus is used, an image processing program for having a computer execute such an image processing method, and a computer-readable recording medium on which such an image processing program is recorded, the present invention makes it possible to calculate color signals while occurrence of moiré signals is further restrained, by performing an interpolation processing with the use of correlations of color signals with respect to an edge in a diagonal direction, as well as with the use of the characteristics in local areas of an image, when generating color signals of all of R, G, and B for each pixel from color signals output from a solid state image pickup device in which color filters of a plurality of types are separately arranged in each pixel block, through an interpolation processing using color signals of a target pixel and the pixels positioned in the vicinity thereof. Further, since directions in eight directions around the target pixel are detected in order to calculate color signals, it is possible to further reduce moiré signals when the interpolation processing is performed. Furthermore, since some color signals are calculated with repeated implementation of color correlations on other dolor signals that are calculated using the characteristics related to the color correlations thereof, it is possible to further reduce moiré signals. According to the image processing apparatus, the image pickup device, the image processing method, the image processing program, and the readable recording medium of the present invention, it is possible to obtain images in high quality because it is possible to detect edges included in an object with high accuracy and to calculate color signals while occurrence of moiré signals is further restrained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus, comprising:
a data interpolation section for generating a color signal for each pixel using data interpolation processing of color signals for a target pixel and at least one pixel within a vicinity of the target pixel, based on color signals output from a solid state image pickup device, the solid state image pickup device including a plurality of pixel sections on which a plurality types of color filters are separately arranged,
wherein the data interpolation section includes:
a direction data calculation means for calculating a plurality of direction data, each of the plurality of direction data indicating a directional amount along a corresponding one of a plurality of directions including a diagonal direction within the vicinity of the target pixel;
a direction detection means for detecting at least one direction of an edge within the vicinity of the target pixel, by using the plurality of direction data calculated by the direction data calculation means;
a direction color signal calculation means for calculating at least one color signal corresponding to the at least one direction of the edge detected by the direction detection means;
a target pixel color signal calculation means for calculating a color signal for the target pixel, by using the at least one color signal calculated by the direction color signal calculation means; and
wherein the direction color signal calculation means includes:
a color ratio calculation means for calculating a ratio between color signals for two different colors in view of the at least one direction of the edge at an arbitrary position in the vicinity of the target pixel; and
a color signal calculation means for calculating the at least one color signal, by using a correlation of the ratio between the color signals calculated by the color ratio calculation means.

2. An image processing apparatus according to claim 1, wherein:
the direction data calculation means calculates the plurality of direction data, such that each of the plurality of direction data has a value depending on the similarity between one of the plurality of directions and an actual edge direction within the vicinity of the target pixel.

3. An image processing apparatus according to claim 2, wherein:
the direction data calculation means calculates the plurality of direction data, such that each of the plurality of direction data has a value which is smaller as the similarity is larger.

4. An image processing apparatus according to claim 1, wherein:
the plurality of directions further includes at least one of an upper right direction and a lower right direction within the vicinity of the target pixel.

5. An image processing apparatus according to claim 1, wherein:
the direction data calculation means calculates four direction data with respect to four directions respectively, and the four directions being an upper right direction, a horizontal direction, a lower right direction and a vertical direction which pass through the target pixel.

6. An image processing apparatus according to claim 1, wherein:
the direction data calculation means calculates eight direction data with respect to eight directions around the target pixel respectively, and the eight directions being an upper direction, an upper right direction, a right direction, a lower right direction, a lower direction, a lower left direction, a left direction and an upper left direction.

7. An image processing apparatus according to claim 1, wherein:
the direction data calculation means calculates the plurality of direction data, such that each of the plurality of direction data has a value determined in view of the strength of correlation of color signals which varies depending on the presence/absence of the edge.

8. An image processing apparatus according to claim 1, wherein:
the direction detection means determines whether or not a gradient of luminance is so flat that no edge exists within the vicinity of the target pixel, by determining whether or not the maximum value of the plurality of direction data is smaller than a predetermined threshold value, detects that "there is no direction" if the gradient of luminance is so flat, and detects that "there is at least one direction" if the gradient of luminance is not so flat.

9. An image processing apparatus according to claim 8, wherein:
when the direction means detects that "there is at least one direction", the direction detection means detects a direction corresponding to the direction data having the minimum value as an edge direction within the vicinity of the target pixel.

10. An image processing apparatus according to claim 8, wherein:
even if the direction detection means detects that "there is at least one direction", the direction detection means further detects that "there is no direction" when there exist a plurality of directions corresponding to the direction data having the minimum value.

11. An image processing apparatus according to claim 1, wherein:
the direction detection means detects at least one direction corresponding to at least one direction data having the minimum value or a value closer to the minimum value as candidates for an edge direction within the vicinity of the target pixel.

12. An image processing apparatus according to claim 1, wherein:
the direction color signal calculation means includes:
a color difference calculation means for calculating a difference between color signals for two different colors in view of the at least one direction of the edge at an arbitrary position in the vicinity of the target pixel; and
a color signal calculation means for calculating the at least one color signal, by using a correlation of the difference between the color signals calculated by the color difference calculation means.

13. An image processing apparatus according to claim 12, wherein:
the direction color signal calculation means uses, as the arbitrary position in the vicinity of the target pixel, one of (i) a position of the target pixel, (ii) a position of a center of pixels in the vicinity of the target pixel, and (iii) a position of an intersection point of pixels which are adjacent to one another in the vicinity of the target pixel.

14. An image processing apparatus according to claim 1 wherein:
when no pixel having a color component to be calculated exists in the at least one direction detected by the direction detection means, the direction color signal calculation means calculates the at least one color signal corresponding to the at least one direction of the edge by referring to a pixel having the color component to be calculated from among the pixels which are located in the vicinity of the target pixel and which are located in at least one direction other than the detected at least one direction.

15. An image processing apparatus according to claim 14, wherein:
the direction color signal calculation means uses an average value of the color component to be calculated in the pixels which are located in the vicinity of the target pixel and which are in at least one direction other than the detected at least one direction.

16. An image processing apparatus according to claim 8, wherein:
the target pixel color signal calculation means calculates the color signal calculated by the direction color signal calculation means, as the color signal for the target pixel, with respect to the pixel for which the direction detection means detects that "there is at least one direction".

17. An image processing apparatus according to claims 8, wherein:
the target pixel color signal calculation means calculates the color signal for the target pixel by using a bilinear method, with respect to the pixel for which the direction detection means detects that "there is no direction".

18. An image processing apparatus according to claim 1, wherein:
the target pixel color signal calculation means includes:
an average color calculation means for calculating an average color of the color signals corresponding to the plurality of directions detected by the direction detection means, as the color signal for the target pixel.

19. An image processing apparatus according to claim 1, wherein:
the target pixel color signal calculation means includes:
an average color calculation means for calculating an average color of the color signals corresponding to the plurality of directions detected by the direction detection means; and
a multiple color correlation color signal calculation means for calculating the color signal for the target pixel, by using a correlation between the average color calculated by the average color calculation means and a color of the target pixel.

20. An imaging apparatus comprising:
a solid state image pickup device operable to pick up an image of an object;
an analog/digital conversion section operable to perform an analog/digital conversion on image pickup data output from the solid state image pickup device; and
an image processing apparatus according to claim 1 which is operable to perform a signal processing on a digital signal output from the analog/digital conversion section.

21. An image processing method for an image processing apparatus and for generating a color signal for each pixel using data interpolation processing of color signals for a target pixel and at least one pixel within a vicinity of the target pixel, based on color signals output from a solid state image pickup device, the solid state image pickup device including a plurality of pixel sections on which a plurality types of color filters are separately arranged,
the image processing method comprising:
a direction data calculation step performed by a direction data calculation means of the image processing apparatus for calculating a plurality of direction data, each of the plurality of direction data indicating a directional amount along a corresponding one of a plurality of directions including a diagonal direction within the vicinity of the target pixel;
a direction detection step performed by a direction detection means of the image processing apparatus for detecting at least one direction of an edge within the vicinity of the target pixel, by using the plurality of direction data calculated in the direction data calculation step;
a direction color signal calculation step performed by a direction color signal calculation means of the image processing apparatus for calculating at least one color signal corresponding to the at least one direction of the edge detected in the direction detection step;
a target pixel color signal calculation step performed by a target pixel color signal calculation means of the image processing apparatus for calculating a color signal for the target pixel, by using the at least one color signal calculated in the direction color signal calculation step; and
wherein the direction color signal calculation step includes:
a color ratio calculation step performed by a color ratio calculation means of the image processing apparatus for calculating a ratio between color signals for two different colors in view of the at least one direction of the edge at an arbitrary position in the vicinity of the target pixel; and
a color signal calculation step performed by a color signal calculation means of the image processing apparatus for calculating the at least one color signal, by using a correlation of the ratio between the color signals calculated in the color ratio calculation step.

22. An image processing method according to claim 21, wherein:
in the direction data calculation step, the plurality of direction data are calculated, such that each of the plurality of direction data has a value depending on the similarity between one of the plurality of directions and an actual edge direction within the vicinity of the target pixel.

23. An image processing method according to claim 22, wherein:
in the direction data calculation step, the plurality of direction data are calculated, such that each of the plurality of direction data has a value which is smaller as the similarity is larger.

24. An image processing method according to claim 21, wherein:
in the direction data calculation step, four direction data are calculated with respect to four directions respectively, and the four directions being an upper right direction, a horizontal direction, a lower right direction and a vertical direction which pass through the target pixel.

25. An image processing method according to claim 21, wherein:
in the direction data calculation step, eight direction data are calculated with respect to eight directions around the target pixel respectively, and the eight directions being an upper direction, an upper right direction, a right direction, a lower right direction, a lower direction, a lower left direction, a left direction and an upper left direction.

26. An image processing method according to claim 21, wherein:
in the direction data calculation step, the plurality of direction data are calculated, such that each of the plurality of direction data has a value determined in view of the strength of correlation of color signals which varies depending on the presence/absence of the edge.

27. An image processing method according to claim 21, wherein:
the direction detection step includes the steps of:
determining whether or not a gradient of luminance is so flat that no edge exists within the vicinity of the target pixel, by determining whether or not the maximum value of the plurality of direction data is smaller than a predetermined threshold value;
detecting that "there is no direction" if the gradient of luminance is so flat; and
detecting that "there is at least one direction" if the gradient of luminance is not so flat.

28. An image processing method according to claim 27, wherein:
when the it is detected that "there is at least one direction" in the direction detection step, a direction corresponding to the direction data having the minimum value is detected as an edge direction within the vicinity of the target pixel in the direction detection step.

29. An image processing method according to claim 27, wherein:
even if it is detected that "there is at least one direction" in the direction detection step, it is further detected that "there is no direction" in the direction detection step when there exist a plurality of directions corresponding to the direction data having the minimum value.

30. An image processing method according to claim 21, wherein:
the direction detection step includes a step of detecting at least one direction corresponding to at least one direction data having the minimum value or a value closer to the minimum value as candidates for an edge direction within the vicinity of the target pixel.

31. An image processing method according to claim 21, wherein:
the direction color signal calculation step includes:
a color difference calculation step performed by a color difference calculation means of the image processing apparatus for calculating a difference between color signals for two different colors in view of the at least one direction of the edge at an arbitrary position in the vicinity of the target pixel; and
a color signal calculation step performed by a color signal calculation means of the image processing apparatus for calculating the at least one color signal, by using a correlation of the difference between the color signals calculated in the color difference calculation step.

32. An image processing method according to claim 31, wherein:
in the direction color signal calculation step, one of (i) a position of the target pixel, (ii) a position of a center of pixels in the vicinity of the target pixel, and (iii) a position of an intersection point of pixels which are adjacent to one another in the vicinity of the target pixel is used as the arbitrary position in the vicinity of the target pixel.

33. An image processing method according to claim 21 wherein:
when no pixel having a color component to be calculated exists in the at least one direction detected by the direction detection means, in the direction color signal calculation step, the at least one color signal corresponding to the at least one direction of the edge is calculated by referring to a pixel having the color component to be calculated from among the pixels which are located in the vicinity of the target pixel and which are located in at least one direction other than the detected at least one direction.

34. An image processing method according to claim 33, wherein:
the direction color signal calculation step includes a step of using an average value of the color component to be calculated in the pixels which are located in the vicinity of the target pixel and which are in at least one direction other than the detected at least one direction.

35. An image processing method according to claim 27, wherein:
the target pixel color signal calculation step includes a step of calculating the color signal calculated in the direction color signal calculation step, as the color signal for the target pixel, with respect to the pixel for which it is detected that "there is at least one direction" in the direction detection step.

36. An image processing method according to claims 27, wherein:
the target pixel color signals calculation step includes a step of calculating the color signal for the target pixel by using a bilinear method, with respect to the pixel for which it is detected that "there is no direction" in the direction detection step.

37. An image processing method according to claim 21, wherein:
the target pixel color signal calculation step includes:
an average color calculation step performed by an average color calculation means of the image processing apparatus for calculating an average color of the color signals corresponding to the plurality of directions detected in the direction detection step, as the color signal for the target pixel.

38. An image processing method according to claim 21, wherein:
the target pixel color signal calculation step includes:
an average color calculation step performed by an average color calculation means of the image processing apparatus for calculating an average color of the color signals corresponding to the plurality of directions detected in the direction detection step; and a multiple color correlation color signal calculation step performed by a multiple color correlation color signal calculation means of the image processing apparatus for calculating the color signal for the target pixel, by using a correlation between the average color calculated in the average color calculation step and a color of the target pixel.

39. A computer-readable recording medium on which is stored an image processing program for having a computer execute steps to generate a color signal for each pixel using data interpolation processing of color signals for a target pixel and at least one pixel within a vicinity of the target pixel, based on color signals output from a solid state image pickup device, the solid state image pickup device including a plurality of pixel sections on which a plurality types of color filters are separately arranged, the steps comprising:

a direction data calculation step performed by a direction data calculation means of the computer for calculating a plurality of direction data, each of the plurality of direction data indicating a directional amount along a corresponding one of a plurality of directions including a diagonal direction within the vicinity of the target pixel;

a direction detection step performed by a direction detection means of the computer for detecting at least one direction of an edge within the vicinity of the target pixel, by using the plurality of direction data calculated in the direction data calculation step;

a direction color signal calculation step performed by a direction color signal calculation means of the computer for calculating at least one color signal corresponding to the at least one direction of the edge detected in the direction detection step;

a target pixel color signal calculation step performed by a target pixel color signal calculation means of the computer for calculating a color signal for the target pixel, by using the at least one color signal calculated in the direction color signal calculation step; and wherein the direction color signal calculation step includes:

a color ratio calculation step performed by a color ratio calculation means of the image processing apparatus for calculating a ratio between color signals for two different colors in view of the at least one direction of the edge at an arbitrary position in the vicinity of the target pixel; and a color signal calculation step performed by a color signal calculation means of the image processing apparatus for calculating the at least one color signal, by using a correlation of the ratio between the color signals calculated in the color ratio calculation step.

* * * * *